United States Patent

Yamamoto et al.

[11] Patent Number: 5,821,978
[45] Date of Patent: Oct. 13, 1998

[54] IMAGE FORMING APPARATUS FOR FORMING AN IMAGE IN USE WITH A PLURALITY OF LASER BEAM SCANNERS

[75] Inventors: Hiroyuki Yamamoto; Kouichi Takagi; Yuuichi Goto; Yoshiyuki Ichihara; Takashi Murahashi, all of Hachioji, Japan

[73] Assignee: Konica Corporation, Tokyo, Japan

[21] Appl. No.: 713,983

[22] Filed: Sep. 13, 1996

Related U.S. Application Data

[63] Continuation of Ser. No. 200,008, Feb. 22, 1994.

[30] Foreign Application Priority Data

Feb. 25, 1993 [JP] Japan .................................. 5-036361
Feb. 26, 1993 [JP] Japan .................................. 5-038939
Mar. 24, 1993 [JP] Japan .................................. 5-065270

[51] Int. Cl.$^6$ .............................. B41J 2/47; B41J 2/435; G11B 7/00; G11B 7/08
[52] U.S. Cl. ....................................................... 347/235
[58] Field of Search ................................. 358/300, 298; 347/225, 235, 250, 233; 399/151, 46, 130; 342/232, 238

[56] References Cited

U.S. PATENT DOCUMENTS

| 4,973,989 | 11/1990 | Yamamoto | 347/230 |
| 5,113,279 | 5/1992 | Hanamoto et al. | 347/241 |
| 5,126,756 | 6/1992 | Ban | 347/232 |
| 5,142,594 | 8/1992 | Sugishima | 399/130 |
| 5,164,742 | 11/1992 | Baek et al. | 347/234 |
| 5,294,944 | 3/1994 | Takeyama et al. | 347/232 |
| 5,383,007 | 1/1995 | Kinoshita et al. | 399/46 |

FOREIGN PATENT DOCUMENTS

| 0 250 132 | 12/1987 | European Pat. Off. . |
| 0 342 936 | 11/1989 | European Pat. Off. . |
| 57-39669 | 3/1982 | Japan . |
| 62-157070 | 7/1987 | Japan . |
| 2-188713 | 7/1990 | Japan . |

*Primary Examiner*—N. Le
*Assistant Examiner*—Raquel Yvette Gordon
*Attorney, Agent, or Firm*—Frishauf,Holtz, Goodman, Langer & Chick

[57] ABSTRACT

An image forming machine such as a copying machine and a printer for forming an image on a recording medium with plural laser beams. The image forming machine includes an image reader for reading an original image and for simultaneously generating image signals corresponding to the original image; plural laser beam generators for writing the image on the recording medium according to the image signals; an index signal generating circuit for generating plural index signals each of which initiates a respective one of the plural laser beam generators to write the image; and a control circuit for controlling a reading operation of the image reader. In the image forming machine, the control circuit initiates the reading operation of the image reader according to one of the plural index signals.

3 Claims, 23 Drawing Sheets

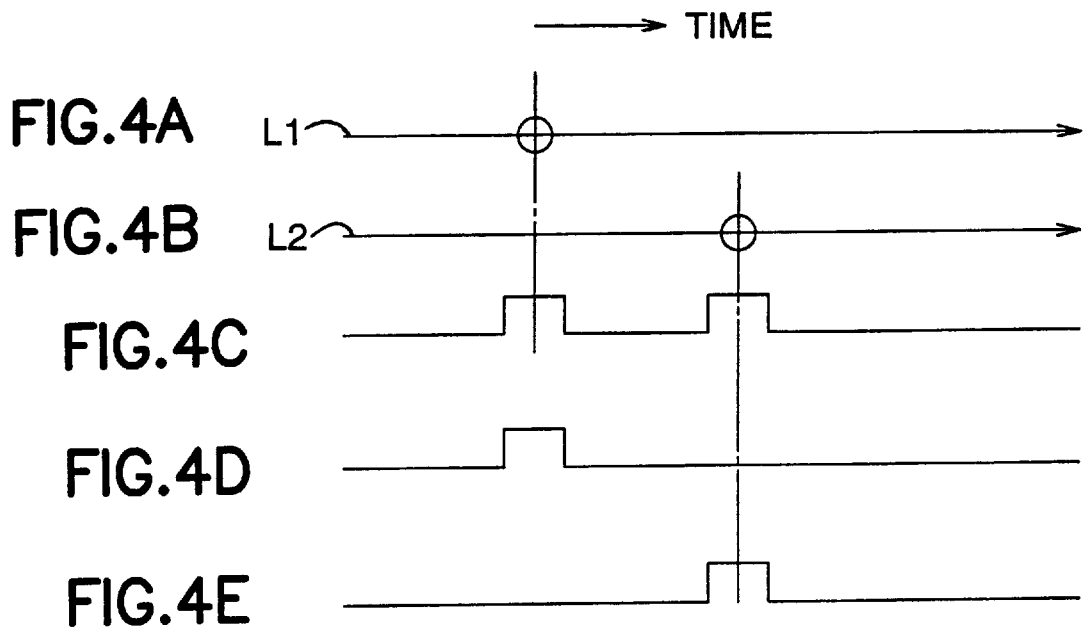
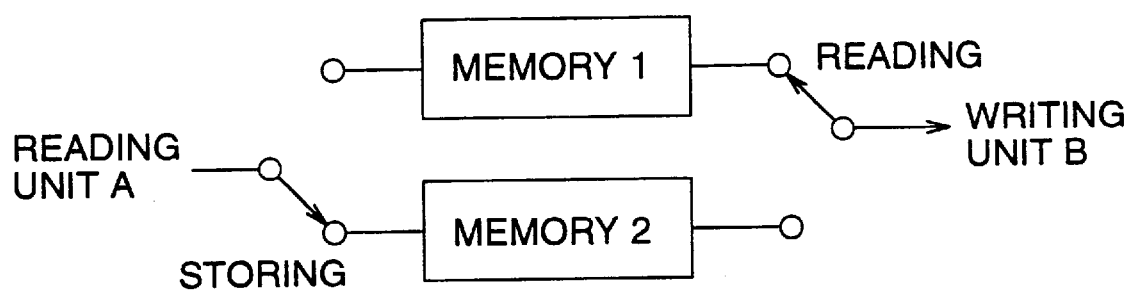
FIG. 5

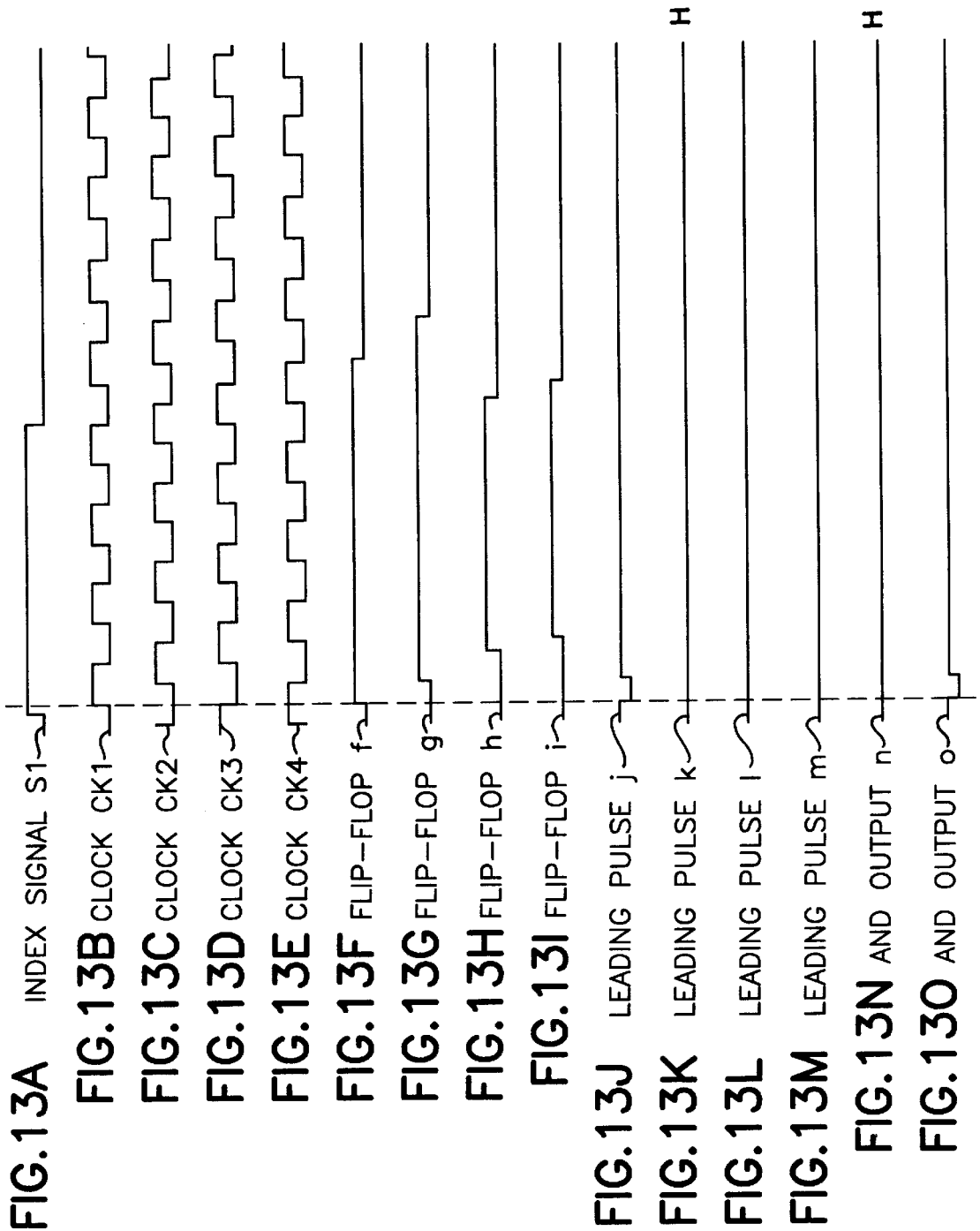

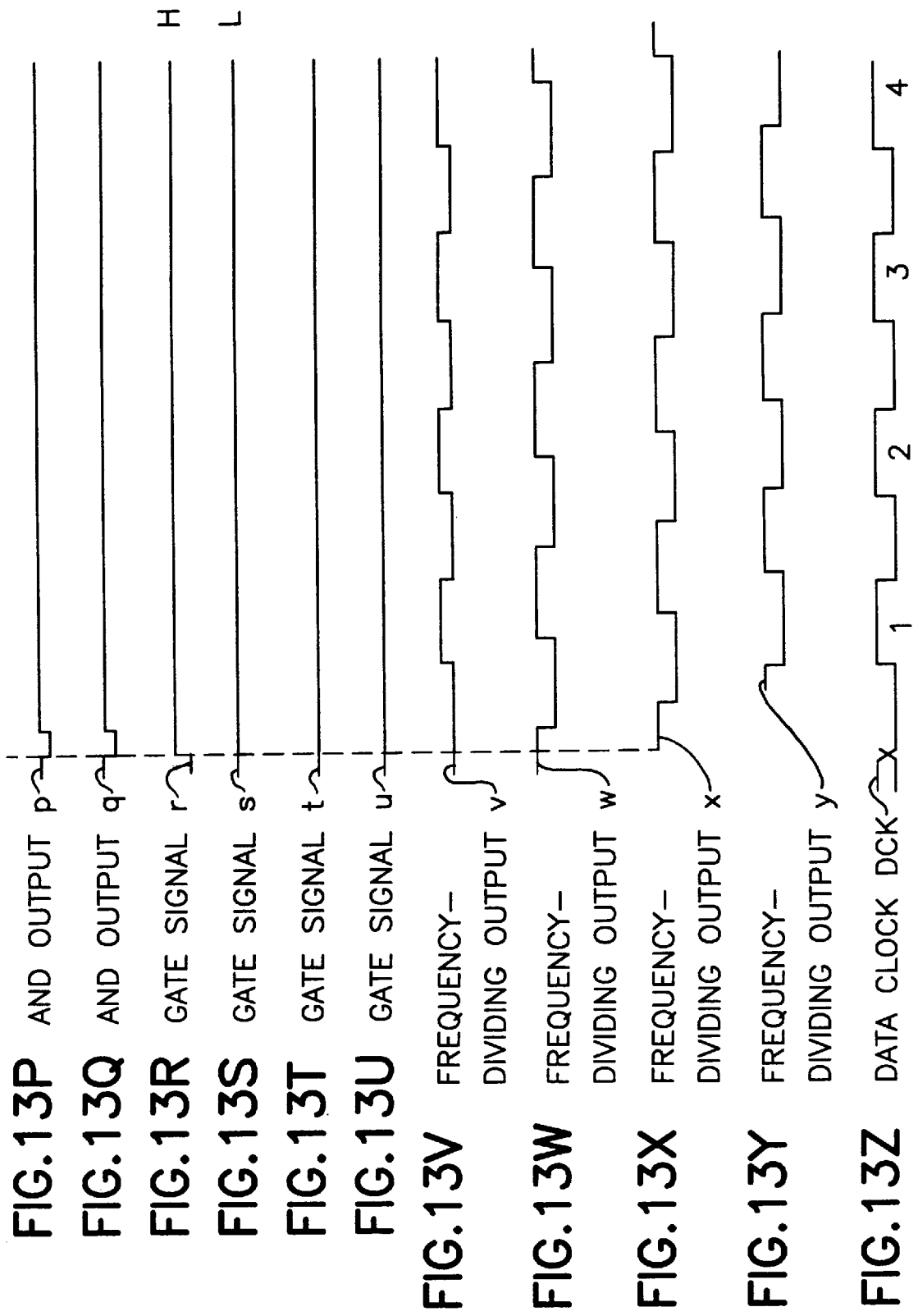

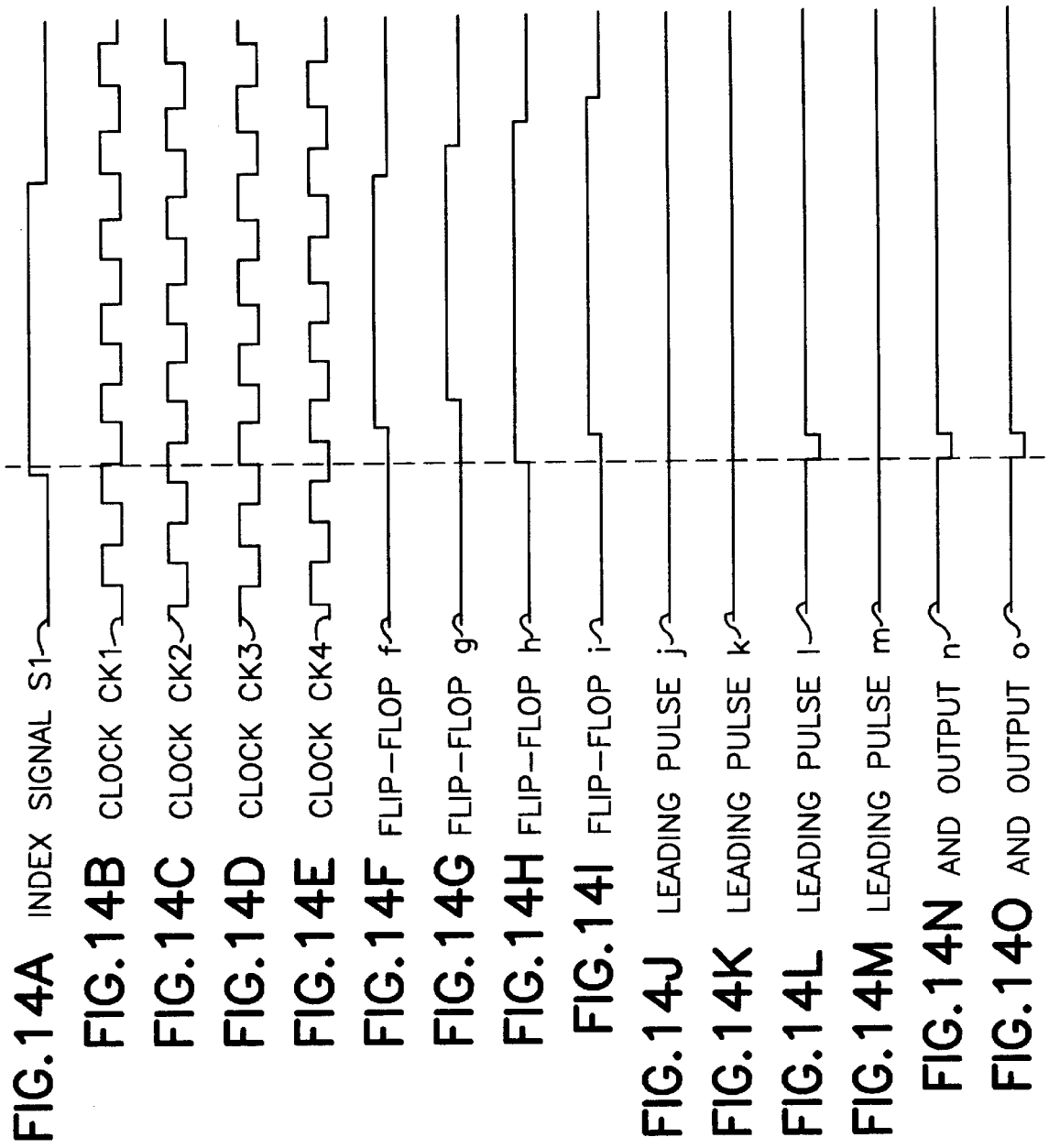

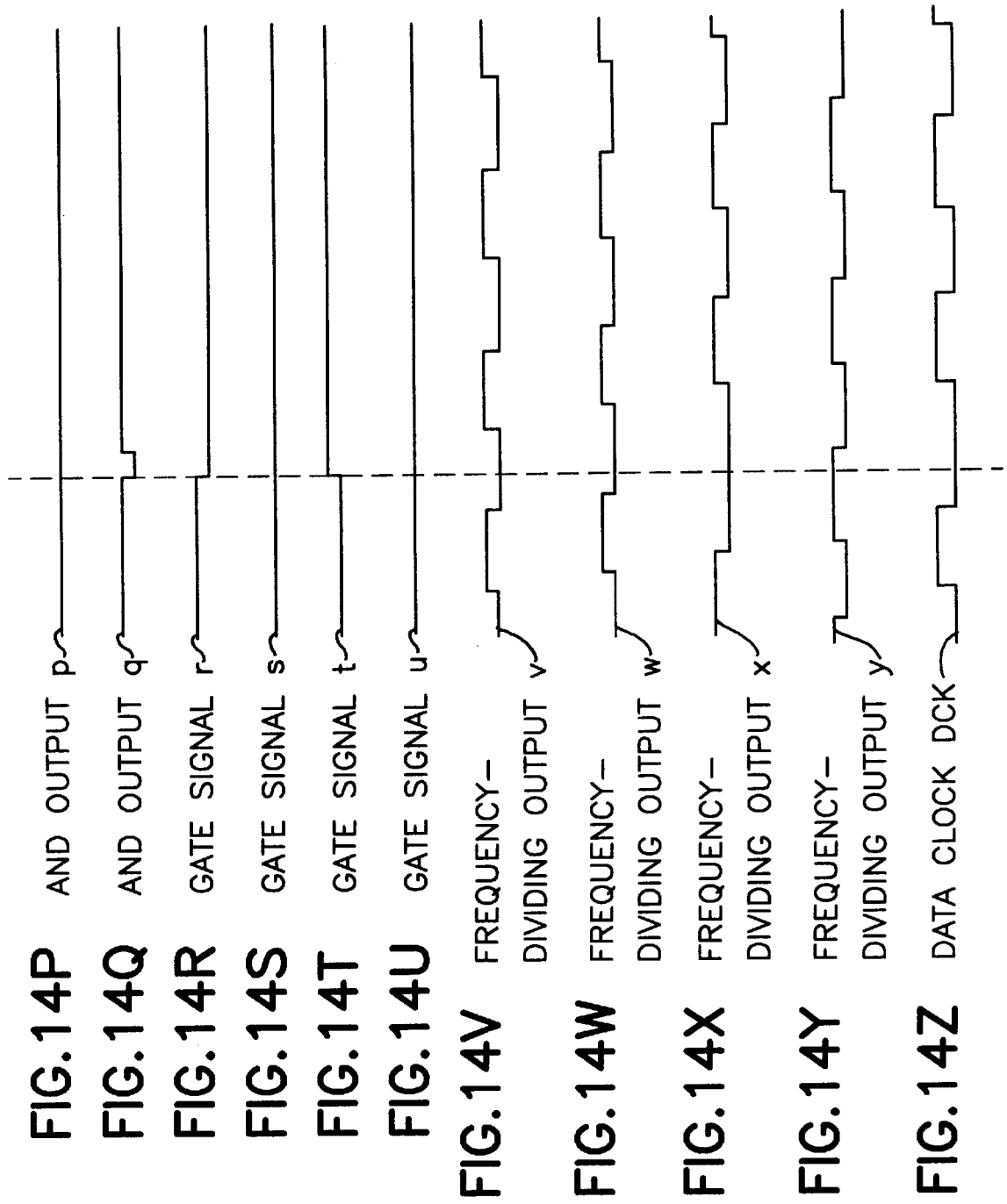

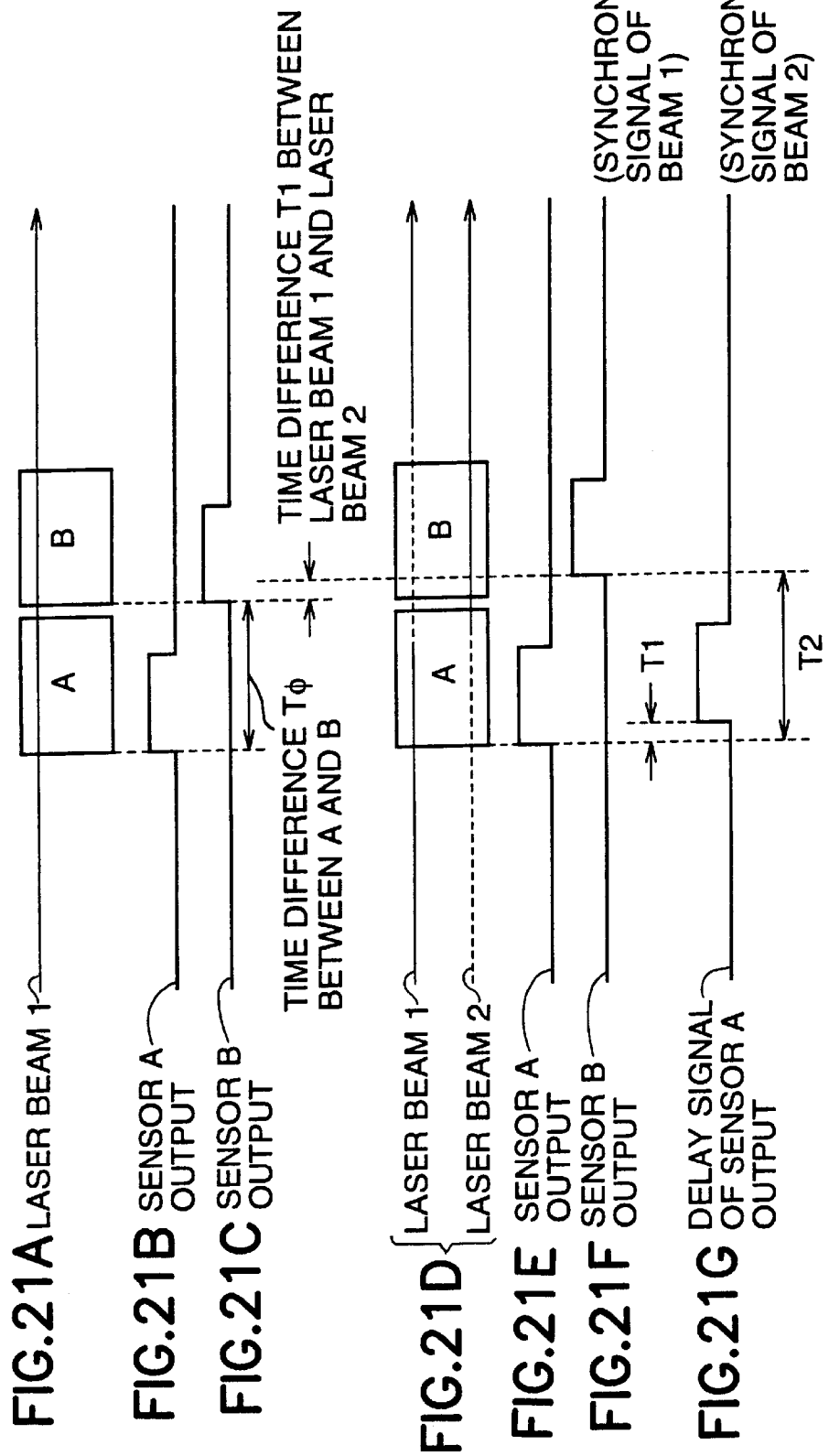

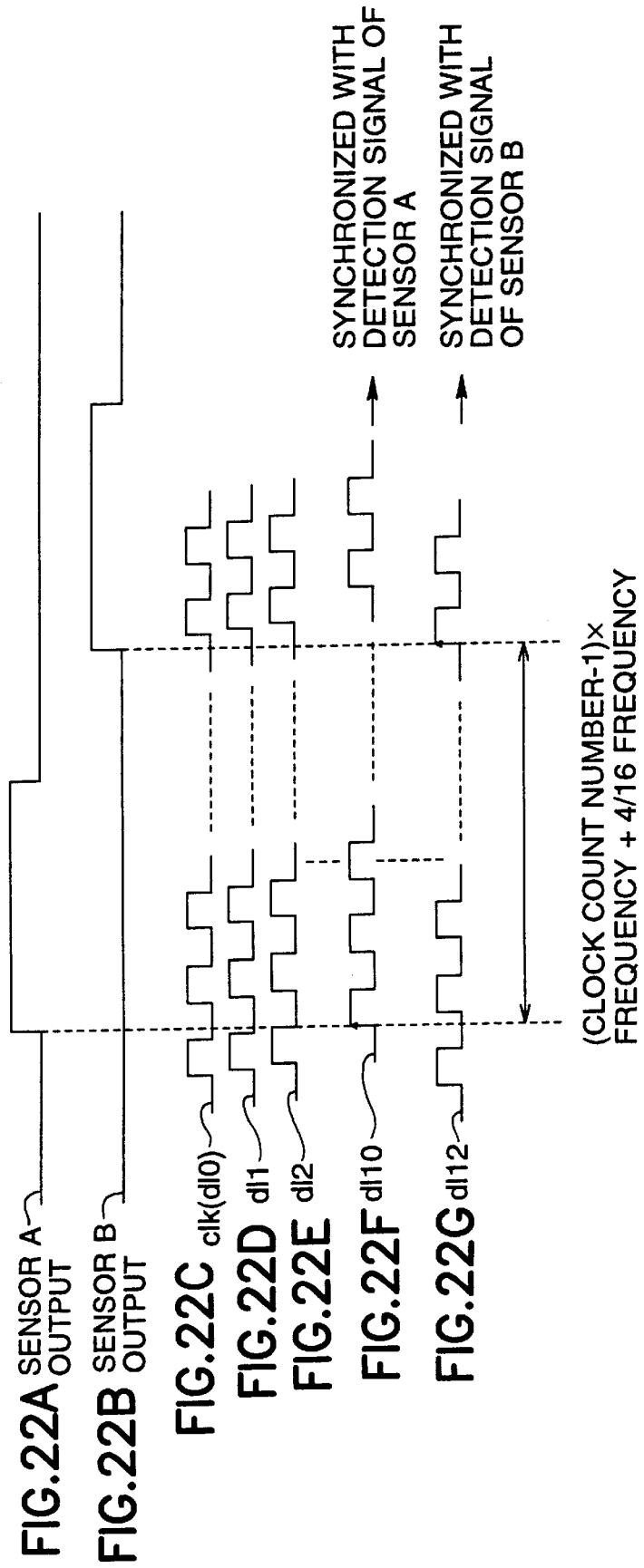

IMAGE FORMING APPARATUS FOR FORMING AN IMAGE IN USE WITH A PLURALITY OF LASER BEAM SCANNERS

This application is a Continuation of application Ser. No. 08/200,008, filed Feb. 22, 1994.

BACKGROUND OF THE INVENTION

The present invention relates to an image forming apparatus, and more particularly, to a technology for synchronizing an reading operation and a recording operation in an image forming apparatus which is of structure wherein an image of a document is read through photoelectric conversion, and information of the read image mentioned above are recorded by means of a plurality of laser beams modulated based on the information of the read image.

Heretofore, there has been known a copying machine of a digital type [Japanese Patent Publication Open to Public Inspection No. 157070/1987 (hereinafter referred to as Japanese Patent O.P.I. Publication)] which is of structure wherein an document is subjected to optical scanning and resulted optical images are converted to electric signals by a photoelectric conversion element such as a line image sensor that receives the optical images, the electric signals are further digitized, and a laser beam is modulated based on image information of the document converted to the digital information to form an electrostatic latent image on a photoreceptor.

In a writing unit employing the laser beam mentioned above, there is provided a sensor (an index sensor) that detects a laser beam entering a scanning area of the laser beam, and there are formed synchronization signals (horizontal synchronization signals or index signals) for controlling the start of recording by the laser beam based on the detection signals of the sensor mentioned above. In the writing unit, a data clock (a writing clock) is created based on the synchronization signals mentioned above, and the laser beam is modulated based on the data clock.

On the other hand, some writing units employing a laser beam as that mentioned above are of structure wherein a plurality of laser beams are used for recording plural lines simultaneously for the purpose of attaining high speed recording. In the structure wherein a plurality of laser beams are used as in the foregoing, when laser beams are arranged in a line along the subsidiary scanning direction, there is a limitation for the shortest distance between adjacent laser beams, which is disadvantageous. In some structures, therefore, plural laser beams are arranged to be staggered in the primary scanning direction.

In the structure wherein plural laser beams are staggered in the primary scanning direction as mentioned above, it is necessary, for avoiding slips in recording positions, that synchronization signals are set for each laser beam so that the start of each laser beam for recording may be controlled. There is therefore disclosed in Japanese Patent O.P.I. Publication No. 39669/1982, for example, a synchronization signal generating device which catches the output change of a sensor that detects a beam at an end of a scanning line to generate synchronization signals.

Incidentally, in the case of a copying machine that is of structure wherein an image of a document is read by a photoelectric conversion element, and an image is formed on a recording medium by a laser beam based on the read image information, a frequency for reading is generally different from that for writing. For absorbing the difference between frequencies mentioned above, therefore, the read image information are stored in a memory by writing them with a reading frequency momentarily, and then the image information stored in the memory are read with a writing frequency.

Further, in order for the above-mentioned operation to be made surely, it is necessary that a reading operation is completed within a writing cycle as shown in FIG. 8.

However, when recording a plurality of lines simultaneously by staggering a plurality of laser beams in the primary scanning direction for scanning as stated above, a plurality of synchronization signals are generated for each laser beam, and each laser beam is staggered in terms of timing for writing. Therefore, it is difficult to satisfy surely the aforesaid relation between reading and writing. Further, a plurality of synchronization signals are generated at the writing side. Therefore, when the aforesaid plural synchronization signals are used for synchronizing at the reading side in the structure, complicated structures of circuits are needed, which has caused a problem.

The present invention has been attained from the viewpoint of the aforementioned problems, and its first object is to achieve that operation control for absorbing a difference between a reading frequency and a writing frequency is conducted surely through a simple constitution in an image forming apparatus that is of structure wherein a writing unit employing plural laser beams for recording plural lines simultaneously is provided and the above-mentioned laser beams are modulated based on image information obtained through reading of a document.

In an image forming apparatus wherein a recording medium is scanned by a laser beam for recording information, there is provided a sensor (an index sensor) that detects a laser beam entering a scanning area of the laser beam, and there are formed synchronization signals (index signals) for controlling the start of recording by the laser beam based on the signals detected by the sensor mentioned above. Further, a data clock (a writing clock) is created based on the synchronization signals mentioned above, and the laser beam is modulated based on the data clock.

In the structure wherein two laser beams are staggered in the primary scanning direction as mentioned above, it is necessary, for avoiding slips in recording positions, that synchronization signals are set for each laser beam so that the start of each laser beam for recording may be controlled. As an example for satisfying the aforesaid condition, there may be considered a structure wherein synchronization signals corresponding to the first laser beam to be irradiated on a recording medium are formed based on the laser beam detection made by an index sensor as stated above, and the start of recording by the second laser beam is controlled by the synchronization signals obtained by inserting an appropriate delay time after generation of the synchronization signals for the first laser beam mentioned above.

However, in the case of a structure wherein synchronization signals corresponding to each of two laser beams are obtained, it is difficult to form highly accurate synchronization signals because there is a possibility that a distance between two laser beams changes depending on ambient conditions. Even when the distance does not change, it is necessary to adjust the aforesaid delay time to be highly accurate, and additional circuits are further needed for generation of the delay time, which is a problem.

As a structure capable of solving the problem mentioned above, Japanese Patent O.P.I. Publication No. 39669/1982 discloses a synchronization signal generating device which catches the change of detected signals of an index sensor that detects a laser beam and generates a plurality of signals corresponding to each laser beam.

The synchronization signal generating device disclosed in Japanese Patent O.P.I. Publication No. 39669/1982 is of structure wherein a sensor having a light-receiving plane capable of receiving plural laser beams simultaneously is provided, and a period of time for a laser beam to enter the sensor is staggered by the period corresponding to the slip of the beam in the scanning direction and a part of it is superimposed, therefore, the detection signals of the sensor (incident energy to the sensor) show a stepwise increment when a plurality of laser beams enter the sensor in succession, while they show a stepwise decrement when plural laser beams leave the incidence area of the sensor in succession, thus the stepwise change is detected and synchronization signals for each laser beam are formed.

However, even in the device mentioned above, there has been a problem that in some cases, highly accurate synchronization signals can not be obtained due to frequency characteristics of circuits and sensors. Namely, in the conventional technology stated above, it is required that a laser beam enters a sensor keeping its constant relative position and its predetermined amount of light, and the detection signals of the sensor show the stepwise change. When a distance between laser beams varies or an amount of light changes, desired sensor output characteristics can not be obtained, and it is feared that an accuracy of synchronization signals is deteriorated. Further, due to the judgment of stepwise output, comparison based on the reference value on a different level is needed, and when rising characteristics of signals are inferior due to frequency characteristics of circuit, extensive delay in response is caused at the high output side, and synchronization signals are deteriorated in accuracy.

On the other hand, as a method for obtaining a data clock from the aforesaid synchronization signal, there are known a method for obtaining a data clock by dividing high oscillated frequency and a method for obtaining a data clock by using a delay line. However, high oscillated frequency to be used requires complicated circuits and an appropriate delay line is difficult to obtain, which is a problem. In particular, when a plurality of laser beams are staggered in the scanning direction and are caused to scan for recording as stated above, it is necessary to form a data clock for each laser beam based on synchronization signals generated for each laser beam. It is therefore desired that a data clock can be obtained through the simple structure wherein an accuracy is ensured.

The present invention has been attained from the viewpoint also of the aforementioned problems, and its second object is to achieve that synchronization signals corresponding respectively to two laser beams can be obtained with high accuracy through a simple structure, and data clocks based on two synchronization signals obtained and corresponding respectively to two laser beams can be formed through a simple structure, in an image forming apparatus that is of structure wherein two laser beams are staggered in the scanning direction for scanning on a recording medium for simultaneous recording on two lines.

Further, for the accidental slip of the scanning position of each laser beam in a plurality of laser beams, there has been taken a measure wherein scanning positions of plural laser beams are staggered on purpose in advance to clarify the relation of scanning positions of the laser beams, synchronization signals corresponding respectively to the laser beams are generated, and recording operation of each laser beam is controlled based on the synchronization signals corresponding to the laser beam (see Japanese Patent O.P.I. Publication No. 188713/1990).

However, when the relation of the scanning positions of plural laser beams determined in advance is lost, it becomes difficult to obtain accurately synchronization signals corresponding respectively to plural laser beams. In the past, therefore, it has been necessary to make the relation of scanning positions of plural laser beams hard to be lost by taking measures such as an improvement in a mechanism for mounting a semiconductor laser or changing a material to that highly resistant to a change of ambient conditions such as a change in heat. Due to this, an apparatus tends to be complicated and high cost substantially, which has been a problem.

The invention has been attained from the viewpoint also of the aforesaid problems, and its third object is to provide a synchronization signal generating device wherein synchronization signals corresponding to the scanning position of each light beam can be obtained accurately and thereby an accurate command to start recording can be sent, in an image forming apparatus which is of structure wherein plural lines are recorded simultaneously through simultaneous scanning of plural light beams.

SUMMARY OF THE INVENTION

An image forming apparatus related to the first example of the invention is one attaining the first object of the invention mentioned above, and it is provided with a reading means that reads an image of a document by means of a photoelectric conversion element, and plural laser beams modulated based on image information obtained through the reading means scan a recording medium to form the aforementioned image on the recording medium. The image forming apparatus comprises a synchronization signal generating means that generates plural synchronization signals corresponding respectively to the aforesaid plural laser beams, a writing-control means that controls writing conducted by the aforesaid plural laser beams by using the aforesaid plural synchronization signals, and a reading-control means that controls, based on one synchronization signal selected from the aforesaid plural synchronization signals, reading of the aforesaid reading means.

Due to the structure mentioned above, one of plural synchronization signals generated corresponding to plural laser beams at the writing side can be selected, and reading can be controlled based on the selected synchronization signal of a laser beam. Namely, the control of reading by the use of synchronization signals at the writing side makes it possible for both writing side and reading side to be coupled surely for operation, and the use of one synchronization signal selected from plural synchronization signals makes it possible to control the synchronization at the reading side without making a circuit structure to be complicated.

The second example of the invention is one attaining the aforesaid second object of the invention, and it represents an image forming apparatus that is of structure wherein laser beams scan a recording medium to record information on the recording medium. The image forming apparatus wherein two laser beams are staggered in the scanning direction for scanning and thereby two lines are recorded simultaneously, comprises a laser beam detecting means that generates detection signals of the aforesaid two laser beams entering in succession at the predetermined reference scanning position, a dividing means that divides the detection signals coming from the laser beam detecting means, and a synchronization signal generating means that generates two synchronization signals for controlling the start of recording respectively for the aforesaid two laser beams based on rising and fall of signals divided by the dividing means.

Further, in the structure, each of the aforesaid two synchronization signals is provided with a data clock forming means comprising a pulse forming means wherein a phase difference generating means generating plural clocks with different phases is provided and output pulses synchronized with the aforesaid synchronization signals at a certain timing by the aforesaid plural clocks and the aforesaid synchronization signals are outputted, plural dividing means which divide respectively the aforementioned plural clocks synchronizing the output pulses outputted by the pulse forming means, a gate means outputting selectively a divided output synchronized with the aforesaid synchronization signals from plural divided output obtained by the plural dividing means, and a gate signal forming means that forms a gate signal for the aforesaid gate means from the aforesaid plural output pulse signals, thus the divided output outputted from each of the aforesaid gate means provided on each of the two synchronization signals is used as a data clock synchronized with each synchronization signal for recording.

In an image forming apparatus wherein two laser beams are staggered in the scanning direction for scanning and thereby two lines are recorded simultaneously, two laser beams enter a laser beam detecting means in succession and detection signals are outputted at an interval corresponding to an interval of a laser beam synchronizing with entering of the laser beams, due to the structure mentioned above. Then, when the aforesaid detection signals are divided by a dividing means, pulse signals showing detection timing of each laser beam are obtained due to rising and fall. Therefore, based on rising and fall of divided output, two synchronization signals corresponding to two laser beams can be generated.

On the other hand, in the structure for forming a data clock used for the control of laser beam recording by using two synchronization signals generated as described above, a plurality of clocks having different phases are generated, the plural clocks are divided, and a divided output with a certain timing for the synchronization signal is selectively outputted as a data clock among divided output.

A synchronization signal generating device of an image forming apparatus in the third example of the invention is one attaining the third object of the invention, and it represents a synchronization signal generating device of an image forming apparatus wherein plural light beams scan a recording medium simultaneously to record plural lines simultaneously, which is characterized by including the following constituting items in its structure.

Namely, in the structure, there are included a means for detecting detection intervals for the same light beam wherein plural light beam detecting means corresponding to the number of the aforementioned light beams are arranged in the scanning direction within the scanning area for the light beam, and only one of the plural light beams enters the plural light beam detecting means, thus the time difference for the same light beam to be detected by plural light beam detecting means is detected based on the detection signals obtained from the plural light beam detecting means, a control means for detecting different light beams that causes only one different light beam to enter one of the plural light beam detecting means, and a synchronization signal outputting means wherein detection signals of the light beam detecting means located at the near side in the scanning direction are delayed based on the time difference detected by the means for detecting detection intervals for the same light beam for the purpose of synchronizing with detecting timing of the light beam detecting means located at the far side in the scanning direction under the condition of entrance control made by the control means for detecting different light beam, thus signals obtained by delaying detection signals of the light beam detecting means located a the near side mentioned above corresponding how light beams entering light beam detecting means respond and detection signals of the light beam detecting means located at the far side are outputted as synchronization signals of each light beam.

In the structure of the present example, there are provided, in place of the aforesaid synchronization signal outputting means, a means for detecting detection intervals for different light beams that detects time difference for the different light beams detected respectively by the different light beam detecting means under the condition of entrance control made by the control means for detecting different light beam, a delay time calculating means that calculates delay time of plural light beams in the scanning direction based on both the time difference detected by the aforesaid means for detecting detection intervals for the same light beam and the time difference detected by the aforesaid means for detecting detection intervals for different light beams, and a means for outputting synchronization signal that outputs detection signals of a light beam detecting means located at the near side in the scanning direction as synchronization signals of a light beam entering the light beam detecting means under the condition of entrance control made by the aforesaid control means for detecting different light beams and further outputs signals obtained by delaying detection signals of the aforesaid light beam detecting means located at the near side in accordance with the delay time calculated by the aforesaid delay time calculating means as synchronization signals of the other light beam.

In the case of the structure wherein delay time in each of plural light beams in the scanning direction is calculated as stated above, it is preferable to provide a leading light beam establishing means wherein a leading light beam that leads plural light beams in the scanning direction is identified from plural light beams based on the time difference detected by the aforesaid means for detecting detection intervals for the same light beam and the time difference detected by the aforesaid means for detecting detection intervals for different light beams, and relative relations between light beam detecting means and plural light beams is renewed and established so that the leading light beam mentioned above may enter the light beam detecting means located at the near side in the scanning direction at the aforesaid control means for detecting different light beams.

When only one light beam is caused to enter each light beam detecting means, detection signals obtained from each light beam detecting means are expected to be outputted with a time difference corresponding to an installation distance of each light beam detecting means.

On the other hand, when a different light beam is caused to enter each light beam detecting means selectively, detection signals from each light beam detecting means are outputted with a time difference corresponding to an installation distance of each light beam detecting means similarly to the occasion wherein the same light enters when the plural light beams are not staggered in the scanning direction, while, when the plural light beams are staggered in the scanning direction, an outputting interval of detection signals changes by the amount corresponding to that staggering.

In this case, when there is no staggering in the scanning direction, if detection signals of a beam detecting means located at the near side in the scanning direction are delayed based on the time corresponding to the aforesaid installation distance for synchronizing with detecting timing of the beam detecting means located at the far side in the scanning direction, the delayed signals can be synchronized with detection signals of the beam detecting means located at the far side in the scanning direction. However, when the aforesaid delay is caused under the condition of staggering in the scanning direction, there still is staggering in quantity corresponding to that of a light beam even if the delay is caused. Due to the delay mentioned above, therefore, it is possible to obtain synchronization signals having a phase difference corresponding to staggering of plural light beams in the scanning direction.

Further, when a different light beam is caused to enter each laser beam detecting means selectively, if the time interval at which the detection signals are outputted from each light beam detecting means is detected, it is possible to obtain the staggering of plural light beams in the scanning direction by calculating the difference between the time difference for outputting detection signals in the foregoing and the time difference for outputting on the occasion wherein the same light beam is caused to enter and detected.

Under the condition that the light beam entering the light beam detecting means located at the near side in the scanning direction leads plural light beams for scanning in beams, when the aforesaid detection signals are delayed by the time by which light beams other than the leading light beam are delayed for scanning with detection signals of the aforesaid light beam detecting means located at the near side as a reference, it is possible to obtain synchronization signals corresponding to light beams staggered in the scanning direction.

When delaying detection signals of the light beam detecting means located at the near side in the scanning direction under the condition that the detection signals represent a reference, the light beam that leads in the scanning direction is required to enter the aforesaid light beam detecting means located at the near side. On the other hand, the leading light beam can be identified from plural light beams by comparing the time difference for outputting detection signals on the occasion wherein the same light beam enters with the time difference for outputting detection signals on the occasion wherein a different light beam enters. Based on the results of the identification, therefore, the leading light beam may be caused to enter the light beam detecting means located at the near side in the scanning direction selectively.

BRIEF DESCRIPTION OF THE DRAWINGS

FIGS. 4A–4E are waveforms showing timing characteristics of synchronization signals in the aforesaid first example.

FIG. 5 is a diagram showing how image data are transferred in the aforesaid first example.

FIGS. 13A–13Z are waveforms for explaining operations in the synchronization circuit in the second example.

FIGS. 14A–14Z are waveforms for explaining operations in the synchronization circuit in the second example.

FIGS. 21A–21G are waveforms showing characteristics of generation of synchronization signals in the fourth example.

FIGS. 22–22G are waveforms showing a method for measuring the interval time of detection signals in the fourth example.

DETAILED DESCRIPTION OF THE INVENTION

The first example of the invention will be explained as follows.

Figure 1:
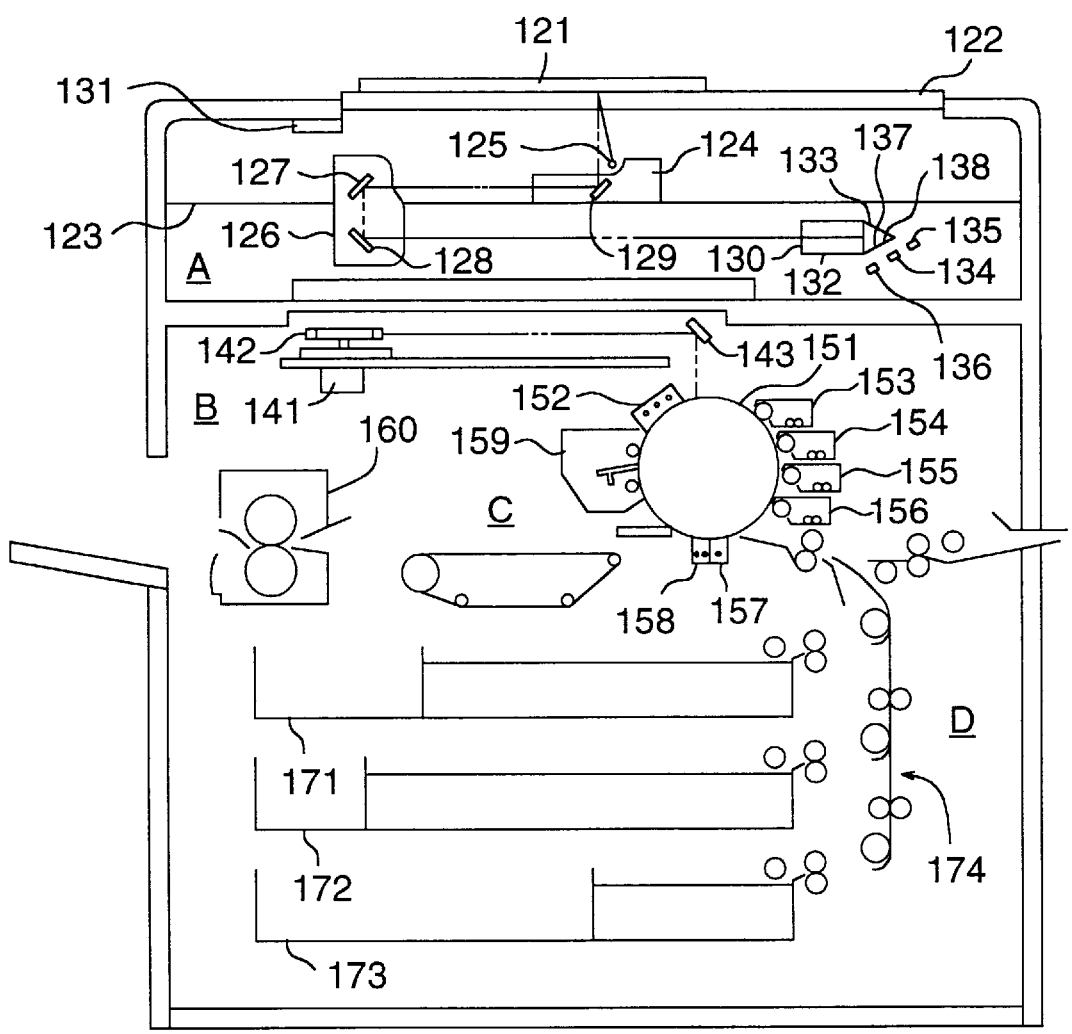
FIG. 1 is a diagram showing the system structure in the example of an image forming apparatus of the invention.

FIG. 1 is a diagram showing the overall structure of a color copying machine of a digital type representing an example of an image forming apparatus of the invention.

In FIG. 1, the color copying machine of a digital type is composed of reading unit A, writing unit B, image forming section C and sheet feeding section D.

In the reading unit A (a reading means), document 121 is placed on platen glass (a document stand glass) 122 and is illuminated by halogen light source 125 provided on carriage 124 that travels on slide rail 123. Mirrors 127 and 128 are provided on movable mirror unit 126 which travels on the slide rail 123. A combination of the mirrors 127 and 128 and mirror 129 provided on the carriage 124 guides reflection light from the document 121 on the platen glass 122 (an optical image) to lens reading unit 130.

At the end portion in the subsidiary scanning direction (moving direction of mirrors) on the reverse side of the aforesaid platen glass 122, there is provided reference white plate 131. When a document is read, the reference white plate 131 is also read and reference white signal (reference white level signal) is obtained.

The lens reading unit 130 mentioned above is composed of lens 132, prism 133, red channel line sensor 134, green channel line sensor 135 and blue channel line sensor 136.

An optical image of the document 121 transferred by the aforesaid mirrors 129, 127 and 128 is converged by lens 132, separated into a red (R) channel image, a green (G) channel image, and a blue (B) channel image by dichroic mirrors 137 and 138 provided in prism 13, and formed as an image on each light acceptance plane of red channel line sensor 134, green channel line sensor 135 and blue channel line sensor 136, thus, the optical image is converted photoelectrically into electric signals (electric image information) by the line sensors 134, 135 and 136. Photoelectric conversion by means of a color line sensor is naturally acceptable.

Electric signals (analog signals) outputted from the aforementioned red channel line sensor 134, green channel line sensor 135 and blue channel line sensor 136 are converted to digital signals and subjected to various processing actions such as density conversion, magnification-change processing and color conversion in an image processing section, and then are outputted to writing unit B.

The writing unit B modulates a laser beam generated from an unillustrated semiconductor laser based on the image signals inputted therein. The laser beam is rotated for scanning by polygon mirror 142 that is rotated by driving motor 141, then, the laser beam passes through an unillustrated fθ lens and an optical path of the laser beam is deflected by reflection mirror 143, thus the laser beam is projected on the surface of photoreceptor drum 151 (recording medium) in image forming section C where an electrostatic latent image is formed on the photoreceptor drum 151 that is uniformly charged.

The image forming section C comprises the photoreceptor drum (image carrier) 151 mentioned above, charging unit 152 for charging the photoreceptor drum 151 uniformly, four developing units 153–156 each containing different color toner, transfer electrode 157, separation electrode 158, cleaning unit 159 and fixing unit 160.

The aforesaid four developing units 153–156 contain respectively yellow Y toner, magenta M toner, cyan C toner and black Bk toner, and formation of an electrostatic latent image and development therefor are repeated for all colors so that a yellow toner image, a magenta toner image, a cyan toner image and a black toner image may be superimposed on photoreceptor drum 151. The color toner image thus superimposed is transferred onto a recording sheet fed from sheet-feeding section D, and then is fixed. Thus, a color copy can be obtained.

The sheet-feeding section D is composed of cassettes 171–173 containing respectively recording sheets in different sizes and recording sheet conveyance system 174 consisting of plural conveyance rollers and a conveyance belt. In accordance with an instruction for a recording sheet size, a recording sheet is taken out of the cassette corresponding to that size among cassettes 171–173, and is fed to image forming section C.

Figure 2:
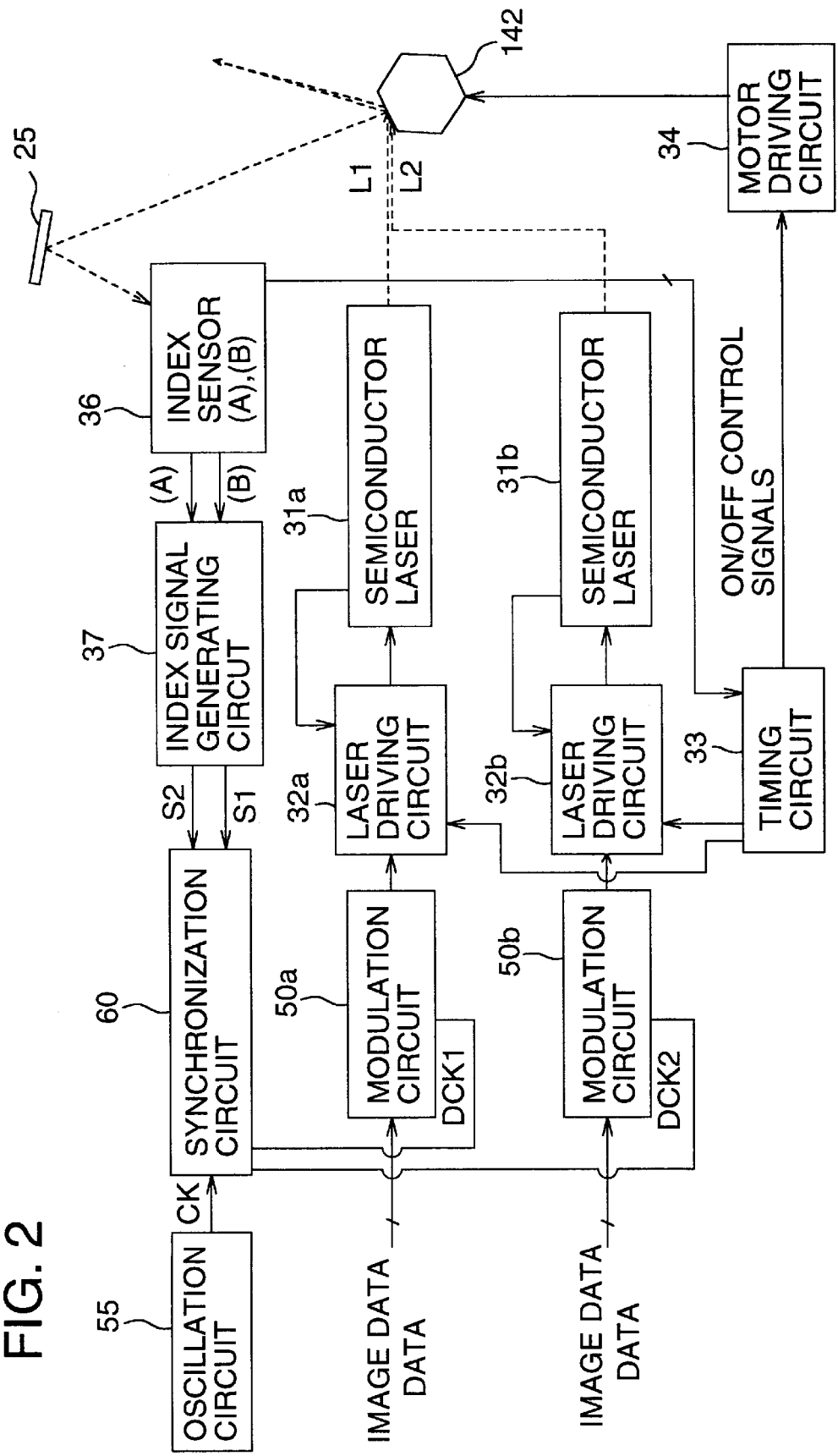
FIG. 2 is a block diagram showing a writing unit in the aforesaid example.

The writing unit B, in this case, is of structure wherein two laser beams which are staggered for scanning in the primary scanning direction so that two lines are recorded simultaneously, and FIG. 2 shows its circuit arrangement.

In FIG. 2, digital image data DATA for each line transmitted from the reading unit A aide are sent respectively to modulation circuits 50a and 50b where signals based on DATA and DCK1 and signals based on DATA and DCK2 are respectively formed.

Signals from the modulation circuit 50a and those from the modulation circuit 50b are sent respectively to semiconductor lasers 31a and 31b respectively through laser driving circuits 32a and 32b, and thereby image recording is carried out by two laser beams L1 and L2 modulated based on image data.

The laser driving circuits 32a and 32b are controlled by control signals from timing circuit 33 so that the laser driving circuits drive only for horizontal and vertical effective sections.

Signals showing a quantity of light of a laser beam are fed back to laser driving circuits 32a and 32b respectively from the semiconductor lasers 31a and 31b, and the semiconductor lasers 31a and 31b are controlled to drive so that the quantity of light may be constant.

Laser beams L1 and L2 outputted respectively from the semiconductor lasers 31a and 31b advance to the aforementioned polygon mirror 142 where they are deflected to scan the photoreceptor drum 151 mentioned above. Start points (reference scanning positions) of laser beams L1 and L2 both deflected by the polygon mirror 142 are detected by index sensor 36, and the detection signals are fed to index signal (synchronization signal) generating circuit 37 (synchronization signal generating means), thus, index signals (synchronization signals) S1 and S2 which are used by the index signal generating circuit 37 for controlling the start of recording of each of laser beams L1 and L2 are formed.

The index signals S1 and S2 mentioned above are fed to synchronization circuit 60 (writing control means). Fundamental clock CK having a predetermined frequency is fed from oscillation circuit 55 to the synchronization circuit 60 which outputs frequency-divided output DCK1 and DCK2 synchronizing respectively with index signals S1 and S2. The frequency-divided output DCK1 and DCK2 mentioned above are supplied respectively to modulation circuits 50a and 50b as a data clock.

The numeral 34 is a driving circuit for motor 141 that rotates polygon mirror 142, and ON/OFF control signals for the driving circuit are supplied from timing circuit 33.

Figure 3:
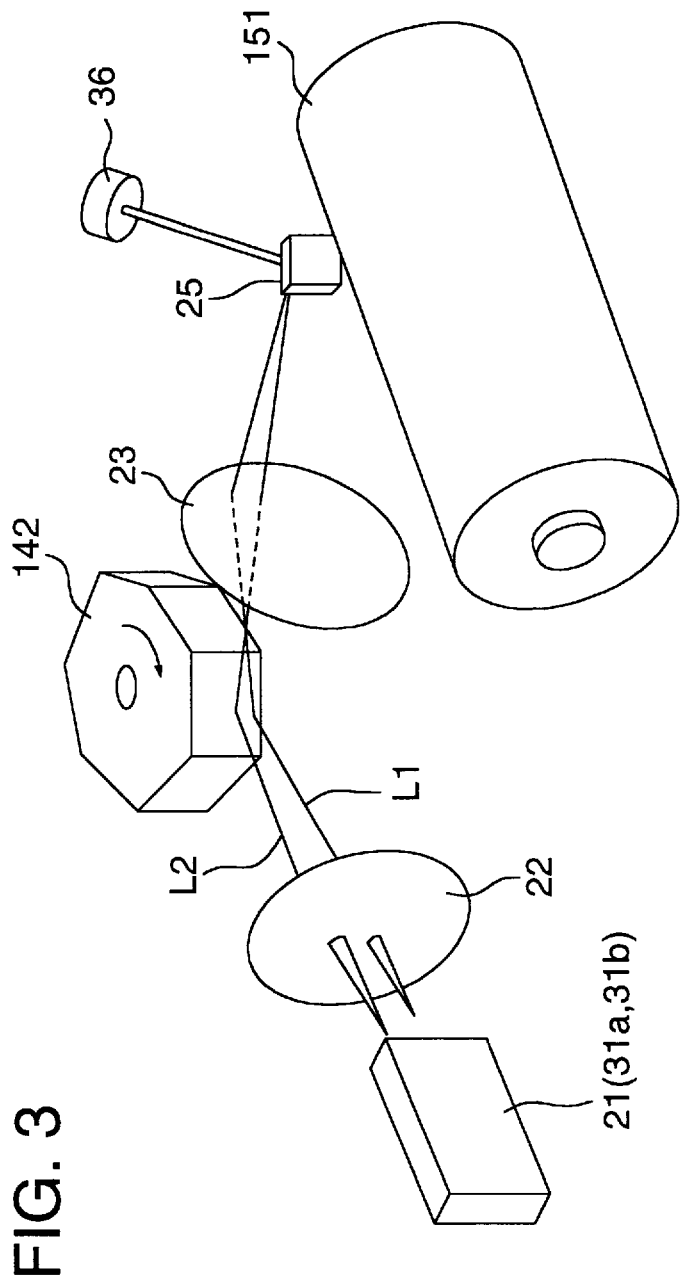
FIG. 3 is a perspective view showing an image exposure system in the aforesaid example.

FIG. 3 is a diagram showing an example of an image exposure system wherein the aforementioned laser beams L1 and L2 form an image.

In FIG. 3, light source unit 21 is composed of the aforesaid two semiconductor lasers 31a and 31b which are arranged in a line, and two divergent light emitted from the light source unit 21 are formed by condenser lens 22 to be two parallel laser beams L1 and L2.

The two laser beams L1 and L2 are projected on polygon mirror 142 where they are deflected, and the deflected two laser beams advance to the photoreceptor drum 151, for scanning thereon through fθ lens 23 (and reflection mirror 143). Incidentally, in FIG. 3, reflection mirror 143 shown in FIG. 1 is omitted.

Owing to the foregoing, exposures corresponding to image data are conducted for two lines simultaneously, and an electrostatic latent image is formed on the photoreceptor drum 151 (recording medium).

In FIG. 3 again, a role of reflection mirror 25 is to guide laser beams L1 and L2 to index sensor 36 when each of the laser beams L1 and L2 is projected on the end of a scanning line.

It is so arranged that the aforementioned two laser beams L1 and L2 may enter the index sensor 36 separately on a time-lagged basis, thereby the index sensor 36 outputs detection signals at a time interval corresponding to a scanning interval between the two laser beams (see FIGS. 4A–4E). Index signal generating circuit 37 into which the output from the index sensor is inputted generates two index signals (synchronization signals) S1 and S2 corresponding respectively to the laser beams L1 and L2 by separating the beam detection signals so that the separated ones may correspond respectively to the laser beams L1 and L2 (see FIGS. 4A and 4B).

Incidentally, the invention is not limited to the constitution wherein one index sensor 36 is used for generating index signals S1 and S2 (see FIGS. 4D and 4E) corresponding respectively to laser beam L1 and laser beam L2. Index signals S1 and S2 corresponding respectively to laser beams L1 and L2 may be generated through the constitution disclosed, for example, in Japanese Patent O.P.I. Publication No. 39669/1982.

In this case, since a frequency for reading by the reading unit A is different from that for writing by the writing unit B, digital image information obtained from the reading unit A are written and stored with a reading frequency temporarily in a memory, and the digital image information stored in the memory are subjected to access from the writing unit B side and then are read in accordance with a writing frequency, as shown in FIG. 5.

In the constitution shown in FIG. 5, there are provided two memories in which image information are stored temporarily, and while read image information are written in a memory on one side on the reading unit A side, access is made to a memory on the other side for reading on the writing unit B side, wherein the memory related to writing and the memory related to reading are switched in succession.

Figure 6:
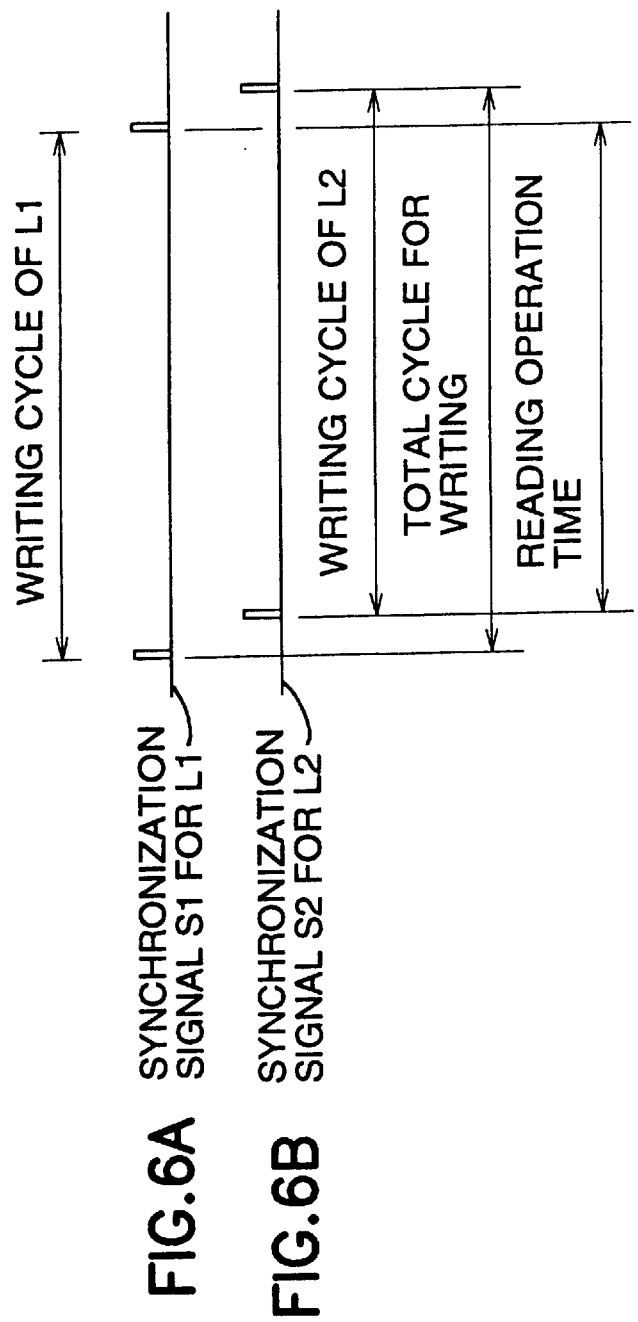
FIGS. 6A and 6B are waveforms showing timing characteristics in a period of reading operation in the aforesaid first example.

When absorbing a difference between a frequency at the reading unit A side and that at the writing unit B side in a manner stated above, it is necessary for the further sure operation that the reading operation is completed within a period of writing operation. When two laser beams L1 and L2 are used for writing as in the foregoing, it is necessary that the reading operation (see FIG. 6B) is completed within a period from synchronization signal S2 (see FIG. 6B) of the laser beam L2 whose writing is time-lagged to synchronization signal S1 (see FIG. 6A) of the laser beam L1.

For the purpose of attaining that the reading operation is actually completed within the aforementioned period, the two synchronization signals S1 and S2 mentioned above may be given to the reading unit A side. This arrangement, however, requires complicated structure for the circuit that generates timing for reading, which is not preferable. For the occasion shown in FIGS. 6A and 6B, it is preferable to employ an arrangement wherein synchronization signal S2 is given to the reading unit A side so that the reading operation may be controlled to be completed within a period from the generation of the synchronization signal S2 to the generation of the following synchronization signal S1 (see FIGS. 6A and 6B).

Therefores in the arrangement employed in the present example, index signal S2 corresponding to laser beam L2 generated by index signal generating circuit 37 of writing unit B is sent to the reading unit A side and reading synchronized with the index signal S2 is conducted by the reading unit A.

Figure 7:
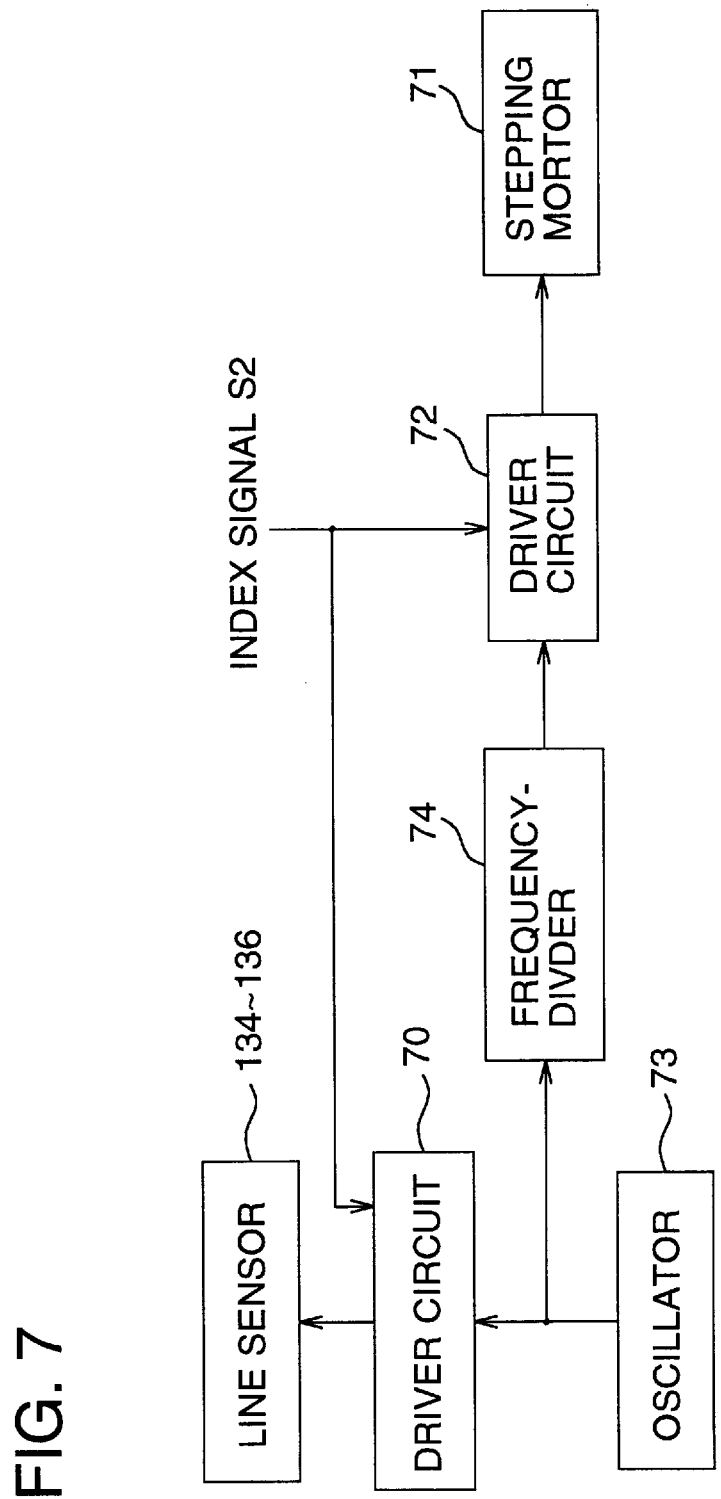
FIG. 7 is a block diagram showing a reading unit in the aforesaid first example.
Figure 8:
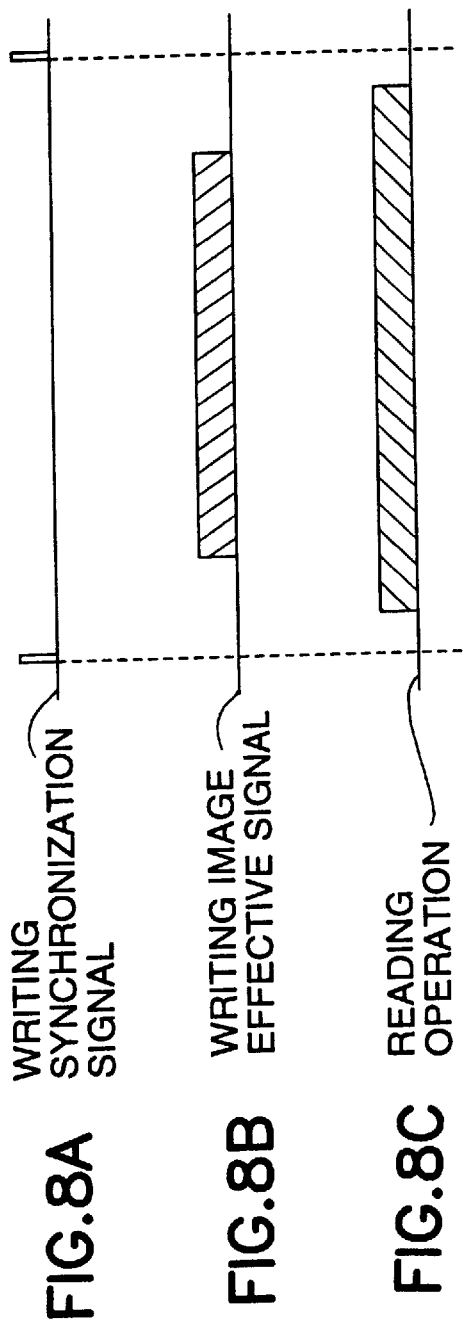
FIGS. 8A–8C are waveform explaining the relation between the writing operation (FIGS. 8A and 8B) and the reading operation (FIG. 8C) in the first example.

To be concrete, as shown in FIG. 7, the aforementioned index signal S2 is given to driver circuit 70 that drives line sensors 134–136 of the reading unit A and to driver circuit 72 for stepping motor 71 which moves movable mirror unit 126 in the subsidiary scanning direction and thereby reading synchronized with the index signal S2 is conducted, thus, reading coupled with the writing unit B side can be conducted and the reading operation can be completed surely within a writing period. In this case, the driver circuits 70 and 72 mentioned earlier correspond to the control means for reading in the present example.

In FIG. 7, the numeral 73 represents an oscillator, and 74 represents a frequency divider that frequency-divides a fundamental clock from the oscillator 73 and sends it to driver circuit 72 for the stepping motor 71.

In the above-mentioned example, the structure wherein two laser beams are used for recording two lines simultaneously was explained. However, the structure wherein three or more laser beams are arranged to be staggered for scanning is also acceptable. In this case, again, it is preferable that one of index signals (synchronization signals) generated corresponding to each laser beam is selected and the selected index signal is given to reading unit A for synchronization with writing, and reading is conducted so that it is completed within a required period of operation.

As explained above, in the first example of the invention, one of plural synchronization signals generated at the writing side is selected and given to the reading side so that the writing side may be synchronized surely with the reading side, in an image forming apparatus wherein plural laser beams are used for scanning on a recording medium to record read images thereon. Therefore, synchronization control similar to that in the case where one laser beam is used has only to be done on the reading side, and an operation for absorbing a frequency difference between a reading operation and a writing operation can be carried out surely without requiring circuits of complicated structure, and a reading operation can be coupled with a writing operation satisfactorily for image recording, which are advantages.

The structure of the above-mentioned index signal generating circuit 37 in the second example will be explained in detail as follows.

Figure 9:
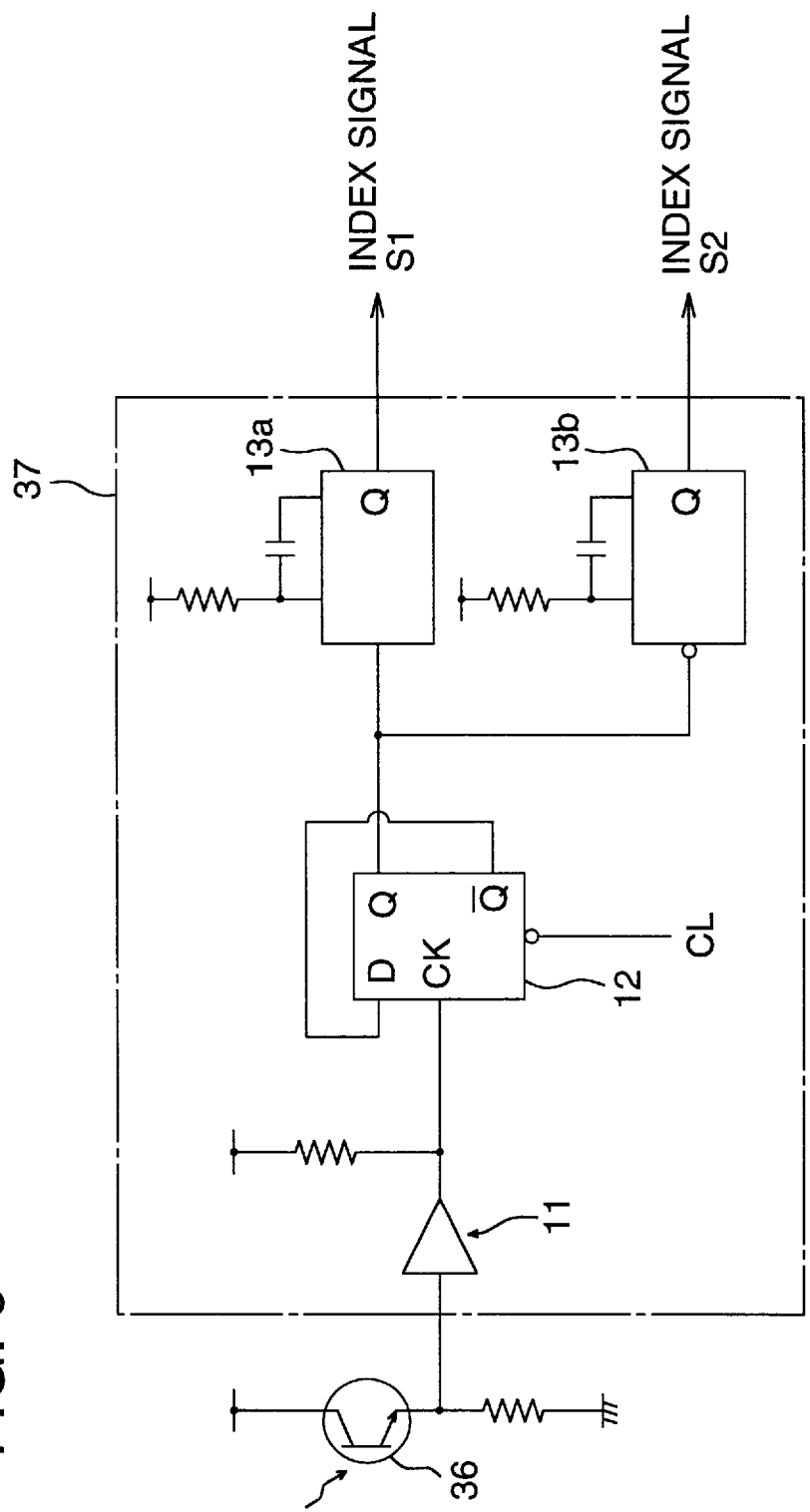
FIG. 9 is a circuit diagram showing an example of an index signal generating circuit in the second example.

FIG. 9 represents a circuit diagram showing the circuit structure of the index signal generating circuit 37 mentioned above which is composed of shaping circuit 11, flip-flop 12 (frequency dividing means) and single-shot multivibrators 13a and 13b (synchronization signal generating means).

Figure 10:
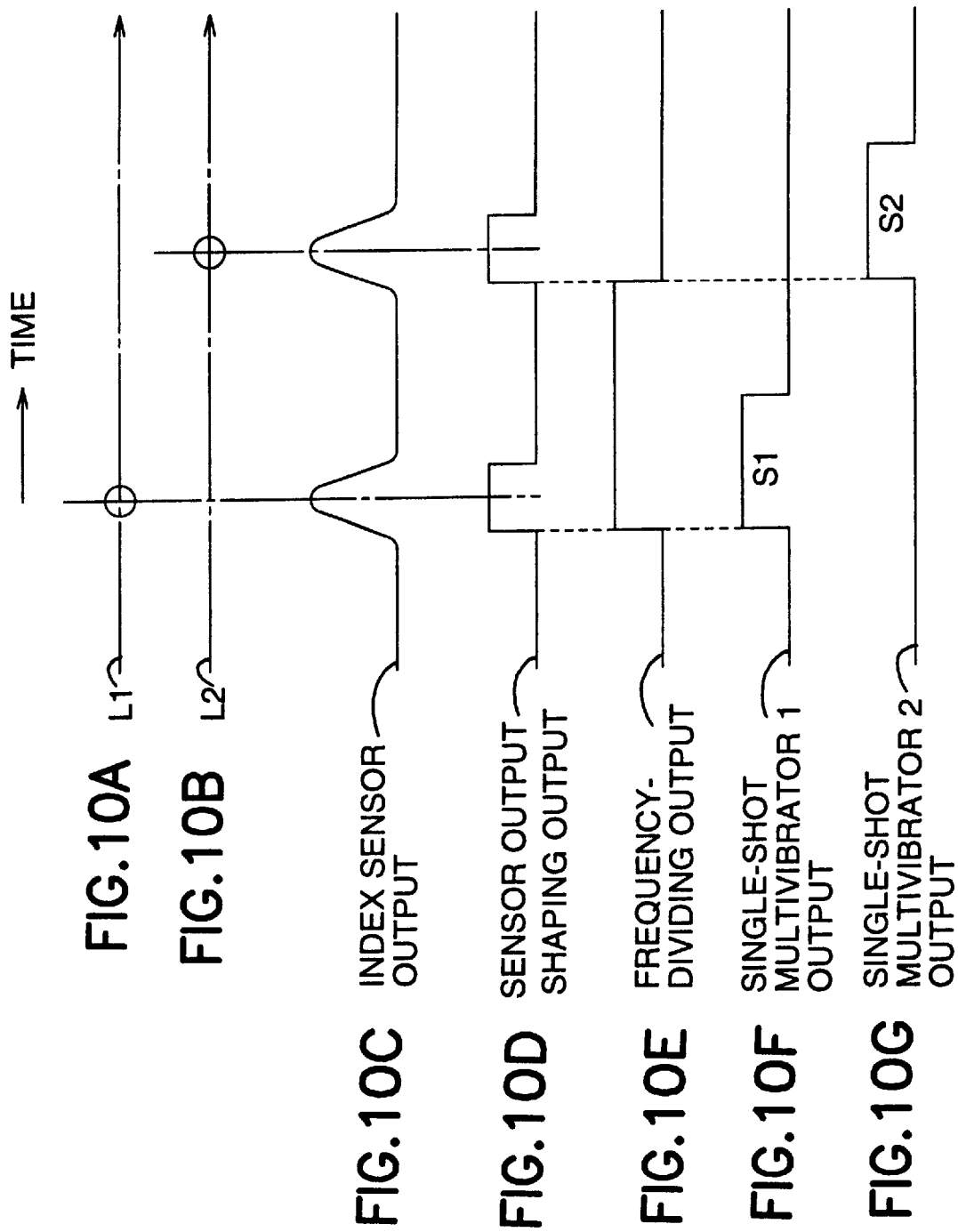
FIGS. 10A–10G are waveforms showing output characteristics of the aforesaid index signal in the second example.

In the present example, two laser beams L1 and L2 are arranged to be staggered in the scanning direction (primary scanning direction), and thereby, the laser beams L1 and L2 enter index sensor 36 (beam detecting means) at a predetermined time interval and output (beam detection signals) of the index sensor 36 are increased at a time interval corresponding to a beam interval, synchronizing with each beam entering the index sensor 36 as shown in FIGS. 10A–10C.

Output signals of the index sensor 36 are sent to the aforesaid shaping circuit 11 where a wave form is shaped to a rectangular wave which shows a high level at a beam detection point (See FIG. 10D).

The beam detection signal whose wave form has been shaped as in the foregoing is sent to the flip-flop 12 which is a frequency dividing means, and there are obtained frequency-divided output (FIG. 10E) wherein a wave rises at a rise of detection pulse of laser beam L1 detected first by the index sensor 36 and falls at a rise of detection pulse of laser beam L2 detected next.

The frequency-divided output of the flip-flop 12 are sent to the single-shot multivibrator 13a as a trigger pulse, and signals obtained by phase-reversing the aforementioned frequency-divided output are sent to the single-shot multivibrator 13b as a trigger pulse.

Due to the foregoing, the single-shot multivibrator 13a outputs pulse signals (FIG. 10F) with a predetermined pulse width that rises in synchronization with detection of laser beam L1 by the index sensor 36, while the single-shot multivibrator 13b outputs pulse signals (FIG. 10G) with a predetermined pulse width that rises in synchronization with detection of laser beam L2 by the index sensor 36.

In this case, output of the single-shot multivibrator 13a are outputted to synchronization circuit 60 as index signal S1 for controlling the start of recording made by laser beam L1, while, output of the single-shot multivibrator 13b are outputted to synchronization circuit 60 as index signal S2 for controlling the start of recording made by laser beam L2.

In the arrangement wherein two laser beams L1 and L2 are arranged to be staggered in the scanning direction for scanning and thereby two lines are recorded simultaneously, when index signals S1 and S2 are formed respectively for the laser beam L1 and L2 independently of each other as stated above, it is possible to true up the recording positions of the laser beam L1 and L2 in the primary scanning direction despite the aforesaid scanning staggered in the scanning direction.

In the index signal generating circuit 37 having the structure mentioned above, index signals S1 and S2 are formed based respectively on detection results of laser beams L1 and L2. Therefore, index signals S1 and S2 synchronized respectively with laser beam L1 and laser beam L2 are obtained without being affected by a scanning interval between laser beam L1 and laser beam L2.

In the index signal generating circuit 37 mentioned above, index signals S1 and S2 respectively for laser beam L1 and laser beam L2 are formed based on detection signals respectively of laser beam L1 and laser beam L2. Therefore, it is possible to obtain signals synchronized with laser beam L1 highly accurately and signals synchronized with laser beam L2 highly accurately without being affected by circuits and frequency characteristics, and it is further possible to obtain two index signals S1 and S2 through a simple arrangement without using a delay circuit that requires precise adjustment.

Figure 11:
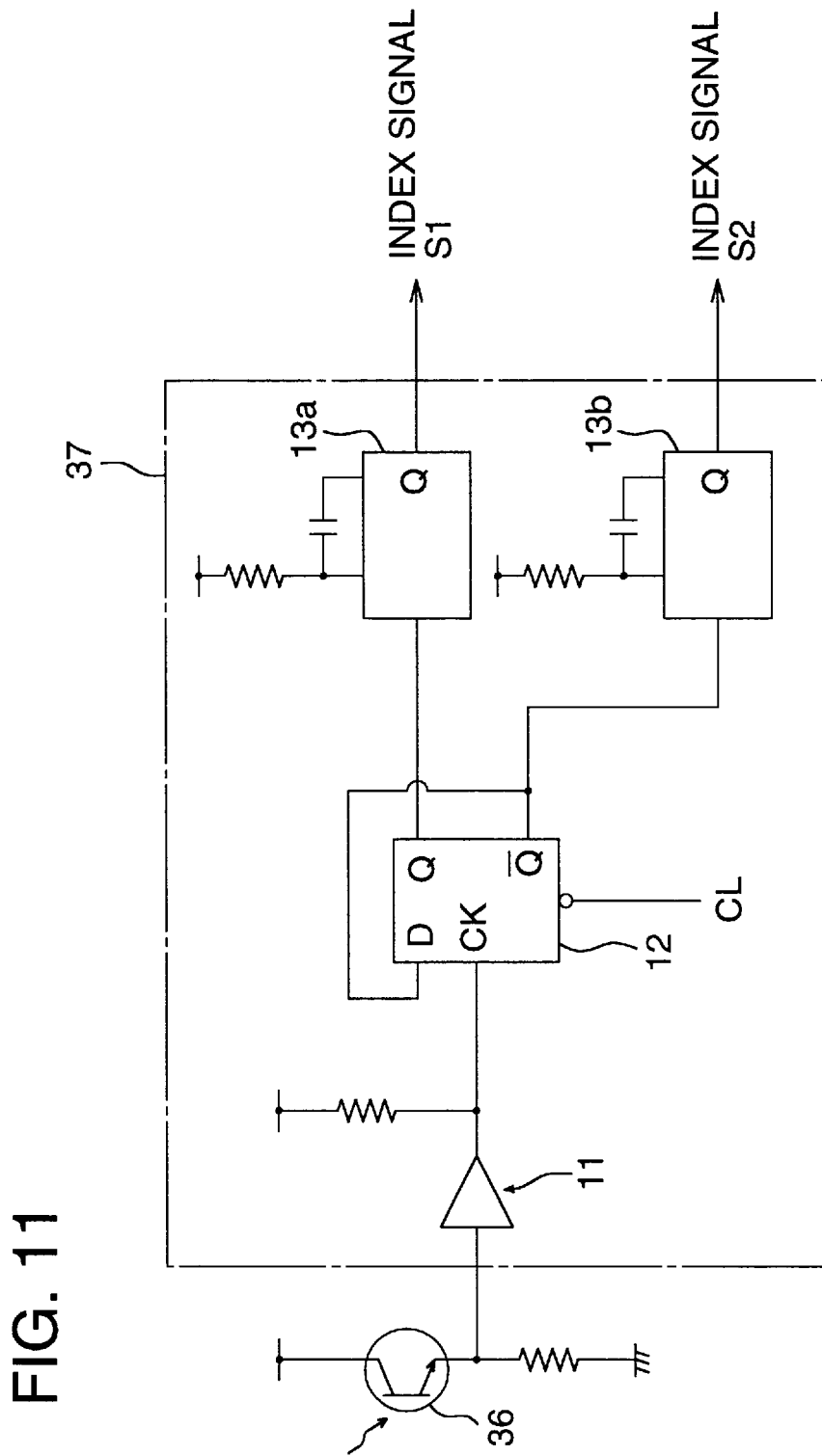
FIG. 11 is a circuit diagram showing another example of an index signal generating circuit in the second example.

Though output Q of flip-flop 12 is reversed and inputted in single-shot multivibrator 13b in the arrangement shown in FIG. 9, an arrangement wherein reversed output $\overline{Q}$ supplied to a data terminal of flip-flop 12 is supplied to single-shot multivibrator 13b as shown in FIG. 11 is also acceptable.

Next, there will be given detailed explanations for synchronization circuit 60 wherein data clocks DCK1 and DCK2 used for modulation of laser beams L1 and L2 are formed based respectively on index signals S1 and S2 outputted from the aforementioned index signal generating circuit 37 in synchronization with start-scanning positions respectively of laser beam L1 and laser beam L2 (see FIGS. 10A and 10B).

Figure 12:
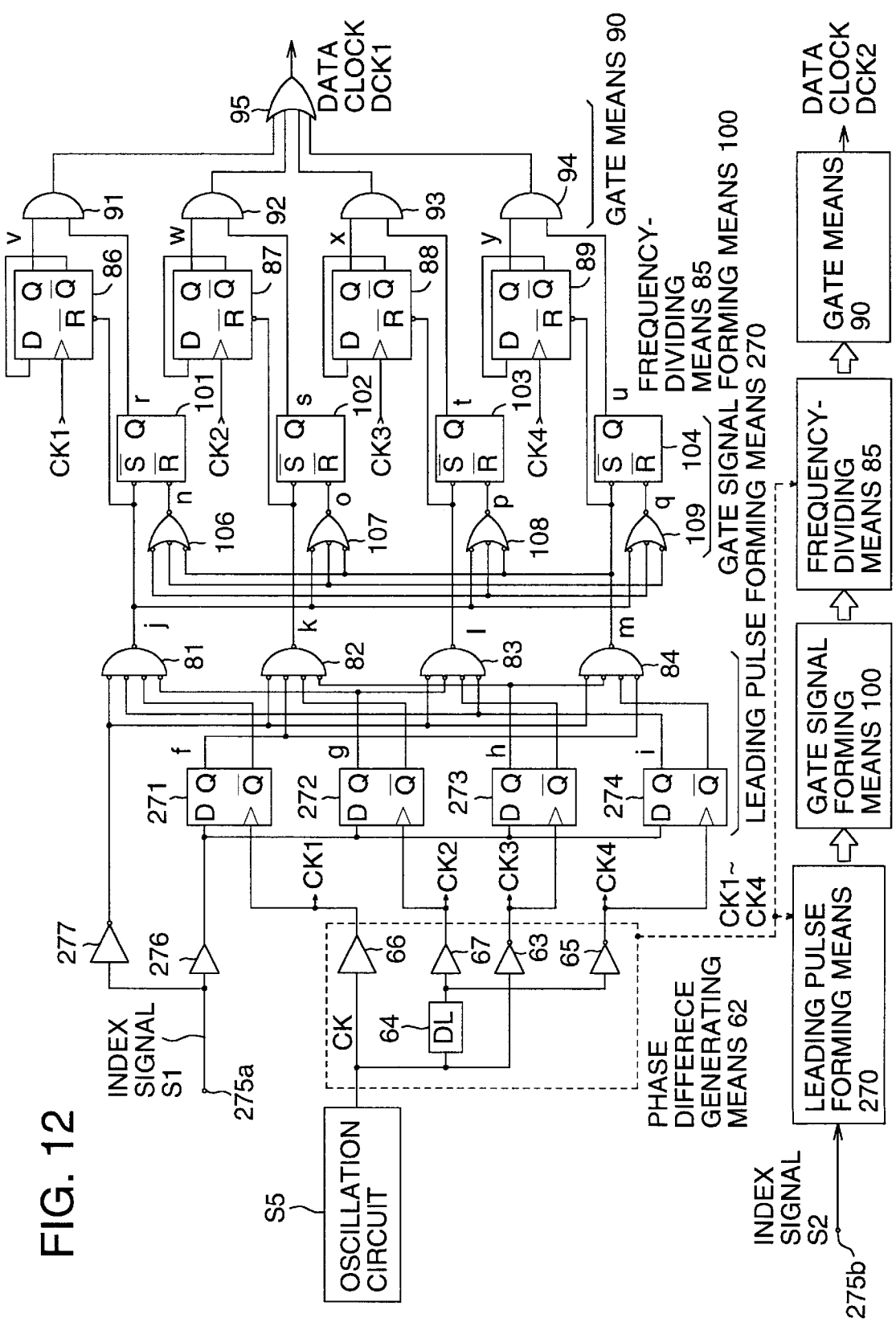
FIG. 12 is a circuit diagram showing an example of a synchronization circuit in the aforesaid second example.

The synchronization circuit 60 is composed of phase difference generating means 62, leading pulse forming means 270, gate signal forming means 100, frequency-dividing means 85 and gate means 90 as shown in FIG. 12. In the present second example, however, data clocks DCK1 and DCK2 are formed respectively for laser beams L1 and L2 based respectively on index signals S1 and S2 corresponding respectively to laser beam L1 and laser beam L2. Therefore, the leading pulse forming means (pulse forming means) 270, the gate signal forming means 100, the frequency-dividing means 85 and the gate means 90 are provided for each of index signals S1 and S2, though the phase difference generating means 62 is used in common. Namely, the synchronization circuit 60 is provided with two data clock forming means each comprising leading pulse forming means 70, gate signal forming means 100, frequency-dividing means 85 and gate means 90 so that the two data clock forming means may correspond respectively to laser beam L1 and laser beam L2 (index signal S1 and index signal S2).

In the circuits provided respectively for index signals S1 and S2, the same processing is conducted by the same circuit. In the following statement, therefore, formation of data clock DCK1 based on index signal S1 is explained mainly, but explanation of formation of data clock DCK2 based on index signal S2 is omitted.

In FIG. 12, clock CK having a predetermined frequency obtained by oscillation circuit 55 is supplied to the phase difference generating means 62.

The phase difference generating means 62 is structured by delay circuit 64, inverter 63 that phase-reverses input clock CK, inverter 65 that phase-reverses clock CK2 outputted from the delay circuit 64, and amplifiers 66 and 67.

In the structure mentioned above, clock CK1 outputted from amplifier 66 represents the reference, and clock CK2 delayed in phase by 90° from the reference is outputted from amplifier 67, clock CK3 (reversal signals of clock CK1) that is delayed in phase by 180° from the reference is outputted from inverter 63, and further clock CK4 (reversal signals of clock CK2) that is delayed in phase by 270° from the reference is outputted from inverter 65 (see FIGS. 13B, 13C, 13D and 13E).

The four clocks CK1–CK4 mentioned above are supplied to clock terminals of D type flip-flops 86–89 which constitute frequency-dividing means 85. These D type flip-flops 86–89 use output outputted from their clock terminals as input data D, and in this example, frequency-divided output v–y each of which is obtained by halving each of clocks CK1–CK4 are outputted (see FIGS.13V, 13W, 13X and 13Y).

On the other hand, index signal S1 (synchronization signal) is supplied to input terminal 275a of synchronization circuit 60, and this index signal S1 and four clocks CK1–CK4 mentioned above are supplied to leading pulse forming means (output pulse forming means) 270. Incidentally, index signal S2 is inputted into synchronization circuit 60 through input terminal 75b.

Leading pulse forming means 270 is composed of four D type flip-flops 71–74 and OR circuits 81–84 which create OR operation.

Index signal S1 is supplied to all input terminals D of D type flip-flops 271–274 in common through amplifier 276 and clock CK1 is supplied to D type flip-flop 271 as its clock signal. In the same manner as in the foregoing, clocks CK2–CK4 are supplied to D type flip-flops 272–274 as a clock signal.

Flip-flop output f–i as shown in FIGS. 13F–13I are outputted from the four D type flip-flops 271–274 mentioned above.

The flip-flop output f–i mentioned above are allotted respectively to OR circuits 81–84, and index signal S1 phase-reversed in inverter 277 is supplied to OR circuits 81–84 in common. Incidentally, pulses j–m outputted respectively from OR circuits 81–84 are called a leading pulse.

The index signal S1 mentioned above as well as flip-flop output f (reversed output), g and i are supplied so that a pulse corresponding to the phase difference of clocks CK1 and CK2 may be outputted from OR circuit 81 as a leading pulse.

In the same manner as in the foregoing, flip-flop output f, g (reversed output) and h are supplied to OR circuit 82, flip-flop output g, h (reversed output) and i are supplied to OR circuit 83, and flip-flop output i (reversed output), f and h are supplied to OR circuit 84.

In the case of the waveforms shown in FIGS. 13A–13Z when the rising of a clock waveform (FIGS. 13B–13E) is defined as a reference, the clock inputted first for index signal S1 is clock CK1 (see FIG. 13B). In this case, therefore, leading pulse j (see FIG. 13J) outputted from OR circuit 81 is used as a leading pulse.

Namely, with regard to leading pulses j–m shown in FIGS. 13J–13M outputted respectively from OR circuits 81–84, a fall thereof shows a rising of the clock inputted first for index signal S1 (see FIG 13A), and the clock inputted first can be identified by finding out, from OR circuits 81–84, the OR circuit from which a leading pulse has been obtained.

These leading pulses j–m shown in FIGS. 13J–13M are supplied to gate signal forming means 100.

The gate signal forming means 100 is composed of RS flip-flop circuits 101–104 (see FIGS. 13F–13I) and AND circuits 106–109 (see FIGS. 13N–13Q) which are provided on the reset terminals side of the RS flip-flop circuits 101–104 and represent AND operation. To the set terminals of the RS flip-flop circuits 101–104, there are supplied leading pulses j–m shown in FIGS. 13J–13M, and to the AND circuits 106–109, there are supplied leading pulses other than those supplied to the set terminals thereof, and outputs of the AND circuits 106–109 are supplied respectively to reset terminals of the RS flip-flop circuits 101–104. Therefore, the AND circuits 106–109 is of structure of 3-input and 1-output.

As a result, when leading pulse j shown in FIG. 13J is obtained from OR circuit 81 as shown in FIG. 13J, RS flip-flop circuit 101 alone is subjected to resetting because of AND output n–q (see FIGS. 13N–13Q) of AND circuits 106–109 are outputted respectively from output terminals Q of flip-flop circuits 101–104.

Namely, when a clock inputted first for index signal S1 (see FIG. 13A) is clock CK1, leading pulse j shown in FIG. 13J is given and thereby only output (gate signal r) of RS flip-flop circuit 101 is set in synchronization with a rising of the aforesaid clock CK1 to be on a high level, and another RS flip-flop circuit 101 keeps a low level without being set.

These gate signals r–u shown in FIGS. 13R–13U are supplied respectively to AND circuits 91–94 constituting gate means 90, and frequency-divided output v–y shown in FIGS. 13V–13Y from frequency-dividing means 85 are supplied respectively to input terminals on the other side of AND circuits 91–94.

In this case, four clocks CK1–CK4 each having a different phase as mentioned above are supplied respectively to D type flip-flops 86–89 constituting the frequency-dividing means 85, and leading pulses j–m (shown in FIGS. 13J–13M) corresponding respectively to them are supplied as reset pulses for them.

As a result, in the case of waveforms shown in FIGS. 13A–13Z, only D type flip-flop 86 is reset by leading pulse j (shown in FIG. 13J) and therefore output v (shown in FIG. 13V) obtained by frequency-dividing clock CK1 inputted into the D type flip-flop 86 synchronizes with the leading pulse j.

Since the above-mentioned leading pulse j (shown in FIG. 13J) is synchronized also with index signal S1, the frequency-divided output v (shown in FIG. 13V) is obtained after all as an output synchronized with clock CK1 inputted first for index signal S1. In the case shown in FIGS. 13A–13Z, the frequency-divided output v of FIG. 13V is outputted through AND circuit 91 and OR circuit 95 and is used as data clock DCK1 (see FIG. 13Z).

When a clock inputted first for index signal S1 is clock CK1 as described above, frequency-divided output v (shown in FIG. 13V) obtained by halving clock CK1 in terms of frequency is supplied to the above-mentioned modulation circuit 50a as data clock DCK1 synchronized with index signal S1.

FIGS. 14A–14Z are waveforms showing signal characteristics shown in the case where clock CK3 is inputted first for index signal S1 (see FIG. 14A), and in this case, a leading pulse l (shown in FIG. 14L) is obtained from among leading pulses j–m shown in FIGS. 14J–14M, corresponding to the clock CK3 (shown in FIG. 14L).

As a result, AND output p (shown in FIG. 14D) alone maintains a high level and thereby only gate signal t (see FIG. 14T) outputted from the third flip-flop 103 is reversed to a high level, thus only the third AND circuit 93 keeps a gate state.

Therefore, output x (shown in FIG. 14X) obtained by halving, in terms of frequency, CK3 inputted in the third D type flip-flop 88 is gated and is used as data clock DCK1 (see FIG. 14Z).

As described above, a frequency-divided output synchronized with a clock inputted first for index signal S1 can be obtained for all cases shown in FIGS. 13A–13Z and 14A–14Z, and it is used as data clock DCK1.

In synchronization circuit 60 shown in FIG. 12, it is possible to halve reference clock CK in terms of frequency only by a simple logical circuit and frequency-dividing means 85 that halves a frequency. Therefore, for using a frequency in 15.27 MHz as a frequency of data clock DCK as stated above and thereby for obtaining an accuracy of ⅛pixels, it has only to use a frequency that is twice that of clock CK outputted from oscillation circuit 61 as an oscillation frequency therefor. This means that highly accurate data clocks DCK1 and DCK2 can be obtained through a simple circuit arrangement, requiring neither an oscillation circuit with a high frequency nor an expensive delay circuit.

Incidentally, a leading pulse synchronized either with clock CK1 or with CK3 has been explained above, and it is apparent that a leading pulse synchronized with other clocks CK2 and CK4 shows the same operation.

Further, in a pulse forming means for obtaining pulses synchronized with index signals S1 and S2 at a certain timing in the example above, an output pulse synchronized with index signals S1 and S2 at the fastest timing is obtained. However, the synchronization timing is not limited to the fastest timing.

In the second example of the invention, as stated above, due to an arrangement, in an image forming apparatus wherein two laser beams are staggered in the scanning direction for scanning so that two lines are recorded simultaneously, that the aforementioned two laser beams are detected independently by sensors and synchronization signals each corresponding to each laser beam are generated by synchronizing them with rising and fall of signals obtained by frequency-dividing the signals obtained through the detection, no complicated circuits are required, frequency characteristics of circuits do not affect, tolerance for variation of laser beam intervals is high, synchronization signals can be obtained accurately through a simple structure, and data clocks each corresponding to each laser beam based on the two synchronization signals can be obtained through a simple structure, which represents an effect.

The third example of the invention will be explained as follows, next.

Figure 15:
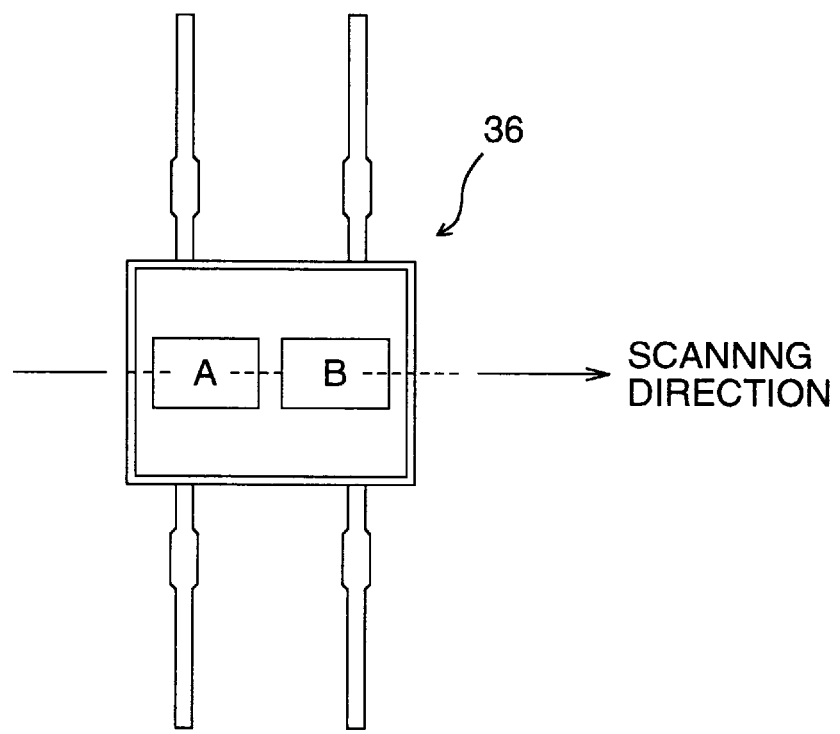
FIG. 15 is a diagram showing the detail of an index sensor in the third example.

As shown in FIG. 15, the aforementioned index sensor 36 is provided with two separated light-acceptors A and B each representing a sensor that outputs detection signals of a light beam. The light-acceptors A and B are arranged to be staggered in the scanning direction of laser beams L1 and L2 so that the two laser beams L1 and L2 may enter each of the light-acceptors A and B. Incidentally, in the following statement, sensor A and sensor B are mentioned for discriminating output of light-acceptor A and that of light-acceptor B in the aforesaid index sensor 36, and the index sensor 36 has therein two built-in laser beam detecting means corresponding to the number of laser beams.

Figure 16:
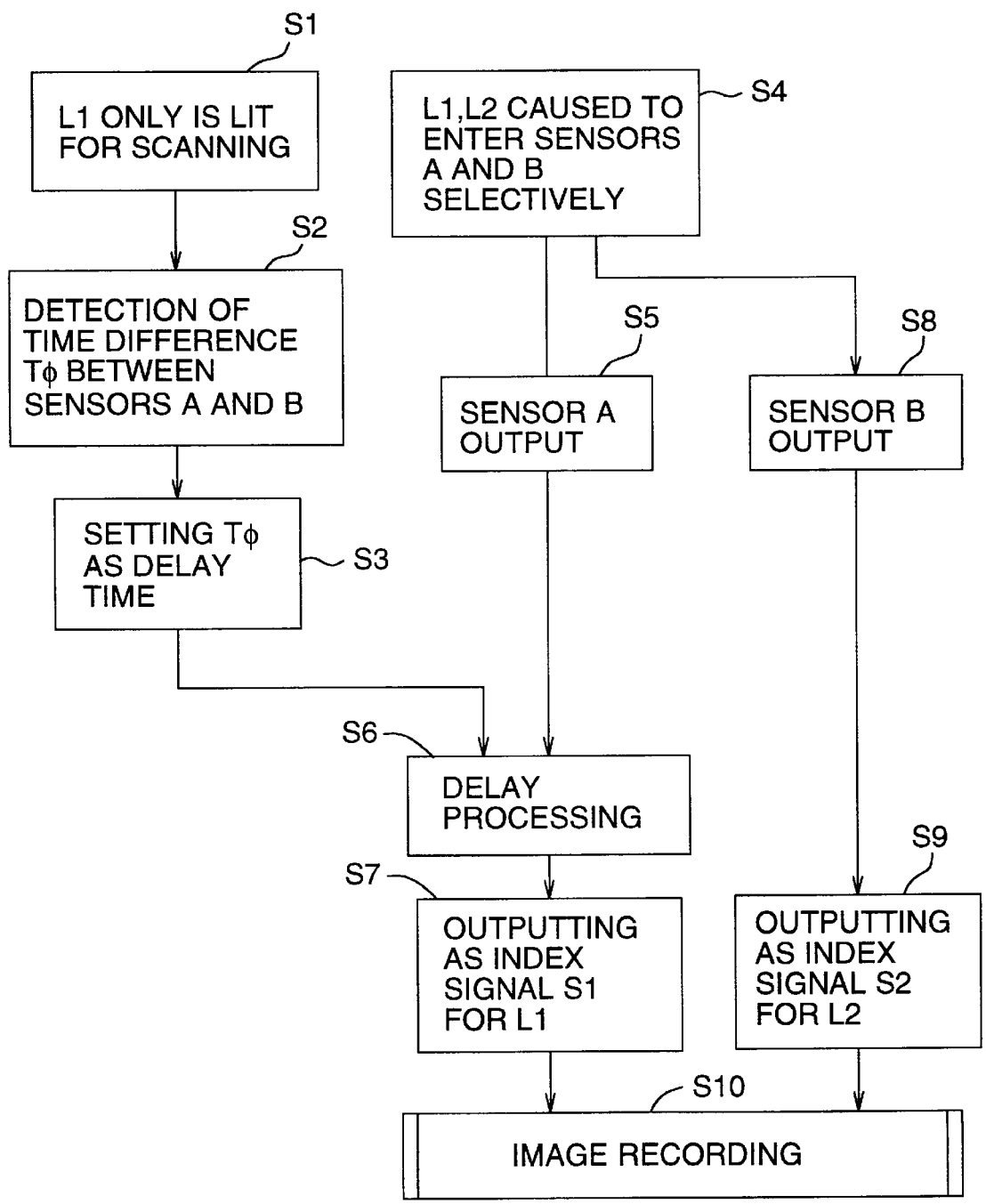
FIG. 16 is a flowchart showing the control of generation of synchronization signals in the third example.

Referring to the waveforms in FIGS. 17A–17G, how generation of index signals S1 and S2 in the aforementioned index signal generating circuit 37 is controlled will be explained in accordance with procedures shown in a flow chart in FIG. 16.

In the first place, when turning on the power or immediately before each image formation, only laser beam L1 on one side is lit for scanning that is the same as that in an ordinary image recording, and the laser beam L1 is caused to enter both sensor A (see FIG. 17A) and sensor B (see FIG. 17B) (two laser beam detecting means) of index sensor 36 (S1).

Figure 17:
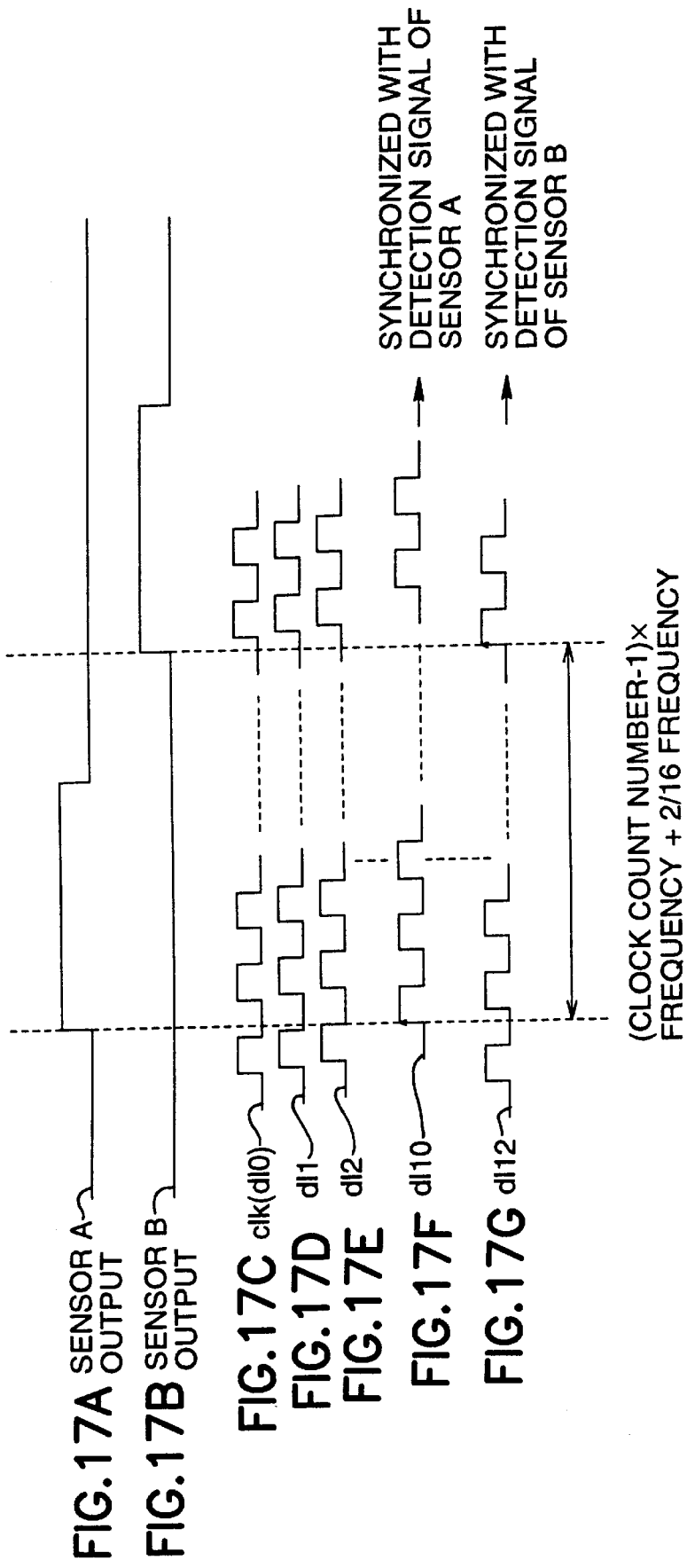
FIGS. 17A–17G are waveforms showing characteristics of generation of synchronization signals in the third example.

In the aforementioned state, period of time T$\phi$ covering from the moment (rising of a detection signal detected by sensor A) when laser beam L1 is detected by sensor A located at the near side in the scanning direction to the moment (rising of a detection signal detected by sensor B) when laser beam L1 is detected by sensor B located at the far side in the scanning direction is measured (see FIGS. 17A and 17B).

The aforementioned period of time T$\phi$ represents a value corresponding to an interval in terms of time between sensor A and sensor B under the condition of a predetermined scanning speed, and it should be the same as that obtained through measurement on the occasion wherein only laser beam L2 is lit for scanning in place of the laser beam L1.

The function of S1 and S2 mentioned above corresponds to a means for detecting detection intervals for the same beam in the third example of the invention.

Next, in the case where index signals S1 and S2 are actually generated for image recording, turning on for each of two semiconductor lasers 31a and 31b is controlled at the scanning end side so that laser beam L1 alone may enter sensor A and laser beam L2 alone may enter sensor B (S4). This S4 function corresponds to a control means for detecting different beams.

To be concrete, when starting scanning, only laser beam L1 is lit first for scanning. Then, when the laser beam L1 is detected by sensor A, the laser beam L1 is turned off immediately, and laser beam L2, in place of L1, is lit for scanning so that the laser beam L2 may be detected by sensor B. After it has been detected by the sensor B, both laser beams L1 and L2 are caused to be in the state wherein they can be turned on to be ready for image recording (see FIGS. 17A and 17B).

Incidentally, in the arrangement wherein when the laser beam L1 is detected by sensor A, the laser beam L1 is turned off immediately, and laser beam L2, in place of L1, is lit, when the scanning point of the laser beam L2 at the moment when it is turned on is located on the sensor A, signals of detection of the laser L2 are outputted undesirably from the sensor A. Therefore, it is preferable to make the sensor A stop outputting (to conduct mask processing) after it has detected the laser beam L1.

In the assumption that sensor A detects laser beam L1 and sensor B detects laser beam L2 as in the foregoing, if the laser beam L1 and the laser beam L2 are not staggered in the scanning direction, a period of time from the timing of detection of laser beam L1 by sensor A to the timing of detection of laser beam L2 by sensor B should be the same as the aforementioned period of time T$\phi$. A deviation from the period of time T$\phi$ corresponds to an amount of the slip between the two laser beams L1 and L2 i n the scanning direction.

In this case, when detection signals obtained when laser beam L1 is detected by sensor A are delayed by the period time T$\phi$, a phase difference between the delayed detection signal and detection signal obtained when laser beam L2 is detected by sensor B corresponds to an amount of the slip between laser beam L1 and laser beam L2 in the scanning direction, and it is apparently the same as signals obtained by detecting laser beams L1 and L2 independently at the same position in the scanning direction.

Therefore, period of time T$\phi$ obtained in advance by turning on only one laser beam L1 for scanning mentioned above is set (S3) as a delay time for detection signals of sensor A, and detection signals (S5) of sensor A obtained when laser beams L1 and L2 are detected by sensors A and B independently through selective lighting thereof at the scanning end side are delayed in accordance with the delay time T$\phi$ (S6).

Then, signals obtained by delaying detection signals of sensor A are outputted (S7) as index signals (synchronization signals) of laser beam L1, and detection signals (S8) of sensor B are outputted (S9) as they are as index signals (synchronization signals) of laser beam L2. Functions of S5–S9 mentioned above correspond to the index signal outputting means in the third example of the invention.

Then, start recording by laser beam L1 and that by laser beam L2 are controlled based respectively on the aforementioned index signals S1 and S2 for actual image recording (S10).

When there is employed an arrangement wherein index signals S1 and S2 respectively of laser beams L1 and L2 are generated in the above method, even when the laser beams L1 and L2 are not staggered constantly, index signals S1 and S2 each corresponding accurately to an amount of the staggering can be generated, thereby, it is possible to give a command for the start of recording accurately based on the index signals S1 and S2.

Further, by measuring the aforementioned period of time T$\phi$ actually, it is possible to correspond the change in scanning speed of laser beams L1 and L2.

In FIGS. 17A–17G, there is shown an example wherein laser beams are staggered so that laser beam L1 may take a lead for scanning. However, an example wherein laser beam L1 is behind for scanning is also acceptable. In this case, it is possible to obtain signals whose rising is behind the detection signals of sensor B by delaying the detection signals of sensor A by the period of time T$\phi$. Therefore, it is not necessary to be nervous about which of laser beams L1 and L2 is taking a lead, and it is possible to obtain index signals S1 and S2 (synchronization signals) corresponding to the then time difference through simple processing.

Incidentally, though the above-mentioned example shows an image forming apparatus employing two laser beams L1 and L2, an image forming apparatus wherein three or more laser beams are employed for scanning simultaneously is also acceptable.

For example, when three laser beams L1, L2 and L3 are used, index sensor 36 provided with three light-acceptors A, B and C arranged to be staggered in the scanning direction is prepared to harmonize it with the number of such laser beams, and any one of the laser beams is lit for scanning to detect time differences Tφ 1 and Tφ 2 respectively between sensor A and sensor B and between sensor B and sensor C.

Then, laser beam L1, laser beam L2 and laser beam L3 are caused to selectively enter respectively sensor A, sensor B and sensor C so that detection signals may be obtained from each of sensor A, sensor B and sensor C.

In this case, detection signals of sensor A are delayed by Tφ 1 plus Tφ 2 and the delayed signals are outputted as index signal S1 for laser beam L1, while detection signals of sensor B are delayed by Tφ and the delayed signals are outputted as index signal S2 for laser beam L2, and further, detection signals of sensor C are outputted, without being processed, as index signal S3 for laser beam L3.

Namely, once time intervals of sensors have been obtained through lighting and scanning of the same laser beam, all have to be done is that each laser beam is caused to enter each sensor independently so that the sensor may output detection signals, detection signals of the sensor located at the near side are delayed by the aforementioned time interval so that the detection signals can be synchronized with the detection timing of the sensor located at the farthest side in the scanning direction.

In this case, time difference in outputting detection signals between sensor A and sensor B can be measured in a method shown in FIGS. 18A–18G, for example.

In FIGS. 18A–18G, (see FIG. 17C) represents reference clock clk, and clocks dl 1–dl 15 each having a phase difference of one sixteenth of the frequency of the reference clock clk are generated. Incidentally, FIGS. 17C–17G show only clocks dl 0, dl 1, dl 2, dl 10 and dl 12, and other clocks are not illustrated.

When a clock synchronized with rising of detection signals of sensor A (a clock rises first immediately after rising of detection signals) is clock dl 10, for example, the rising of the clock dl 10 is counted When detection signals of sensor B rise during the counting mentioned above and if a clock synchronizing the rising of the detection signals proves to be clock dl 12, time difference for outputting detection signals between sensor A and sensor B is represented by a value obtained by adding a phase difference between clock dl 10 and clock dl 12 to a period of time obtained by multiplying, by a cycle of the clock, a value obtained by subtracting 1 from the number of rising of clock dl 10 counted up to the moment when the clock dl 12 appeared.

Figure 19:
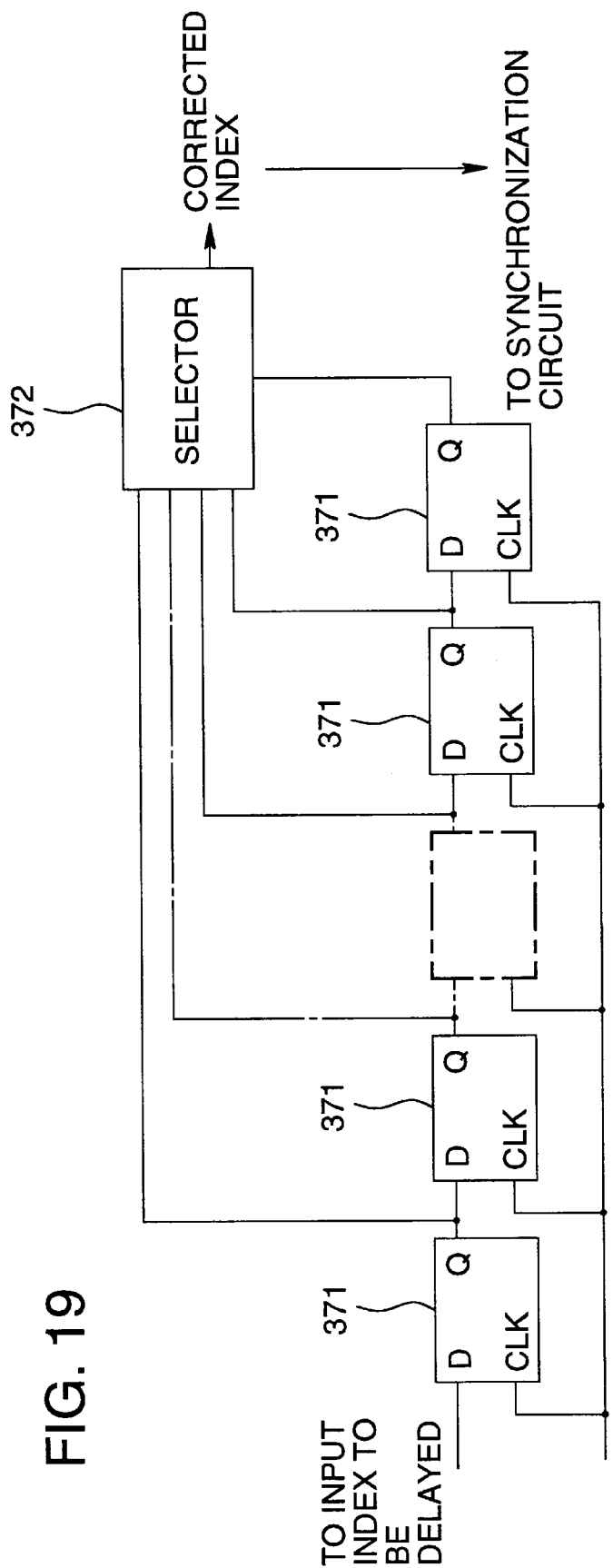
FIG. 19 is a circuit diagram showing an example of constitution conducting delay processing for detection signals in the third example.

When a length of time has been measured in the manner mentioned above, it is possible to delay detection signals of a sensor through a circuit structure shown in FIG. 19 by the use of the results of the measurement.

In FIG. 19, there are provided shift registers in plural steps 371 which are connected in series so that the aforementioned clocks dl 0–dl 15 may be supplied selectively to the shift registers 371. Further, shift output in plural steps by means of the shift registers 371 are all outputted to selector 372 wherein any one of shift output in plural steps is outputted selectively as delayed signals.

Figure 18:
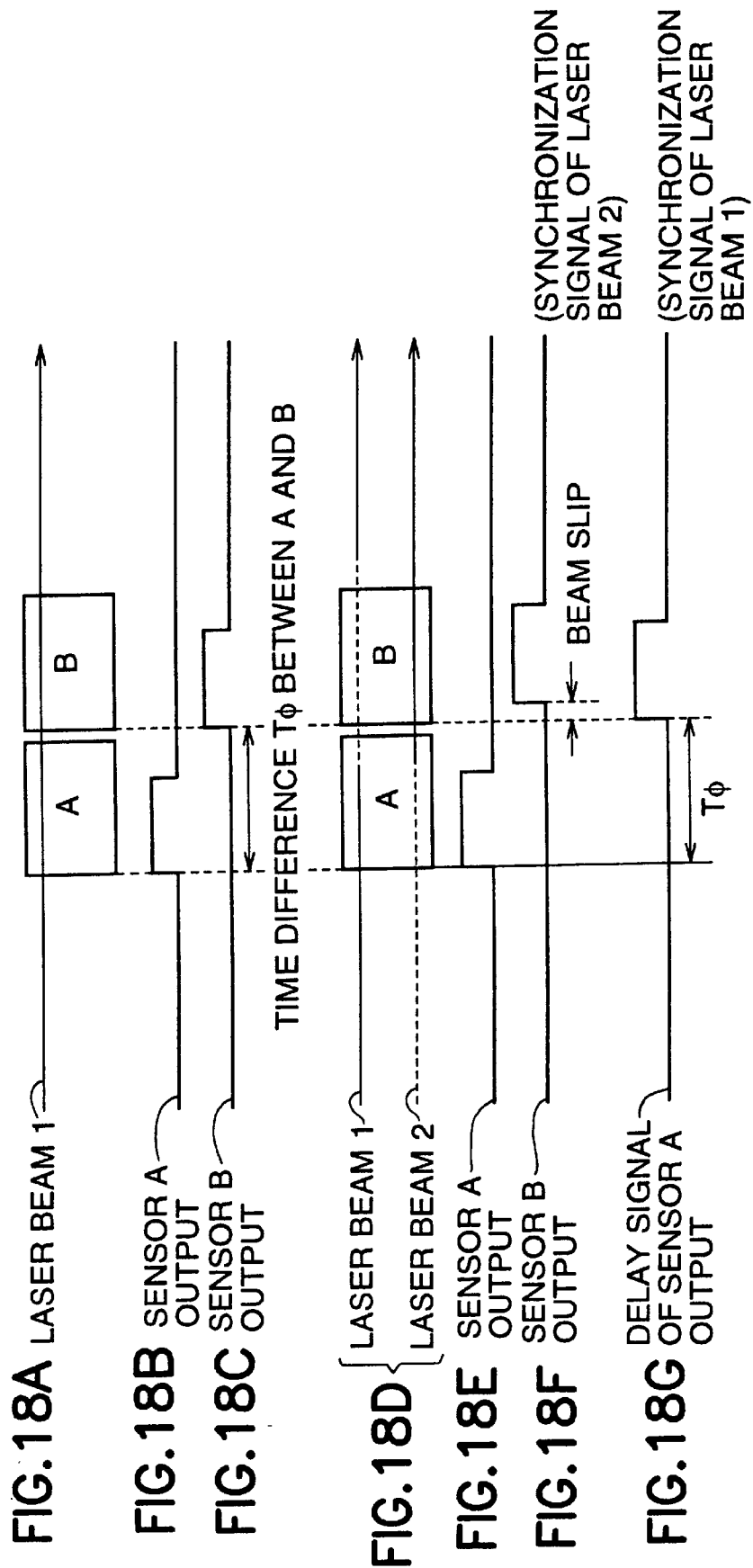
FIGS. 18A–18G are waveforms showing a method for measuring the interval time of detection signals in the third example.

In this case, when the detection signals of sensor A are delayed by the aforementioned length of time measured under the condition that rising of detection signals of sensor A is synchronized with clock dl 10 and rising of detection signals of sensor B is synchronized with clock dl 12 as shown in FIG. 18, for example, clock dl 12 is supplied to each shift register 371 as a clock signal. Namely, supplying clock dl 12 to each shift register 371 makes the shift register 371 to operate through delaying by an amount of a fraction which can not be expressed with a clock cycle.

On the other hand, as an output of each shift register 371, a signal shifted by the number corresponding to the count number obtained by subtracting 1 from the count number of clock dl 10 can be selected by selector 372 to be outputted. For example, when the count number of a clock is 3, an output of a shift register on the second step that is delayed by two cycles can be selected by selector 372.

Incidentally, in the third example described above, index signals S1 and S2 having a phase difference corresponding to a time lag in the laser beams L1 and L2 in the scanning direction are obtained by delaying by time difference Tφ of sensors. However, an arrangement wherein a time lag in the scanning direction between laser beams L1 and laser beams L2 is actually calculated, and based on the time lag thus calculated, detection signals are delayed to obtain index signals S1 and S2 corresponding respectively to laser beams L1 and L2, is also acceptable.

Figure 20:
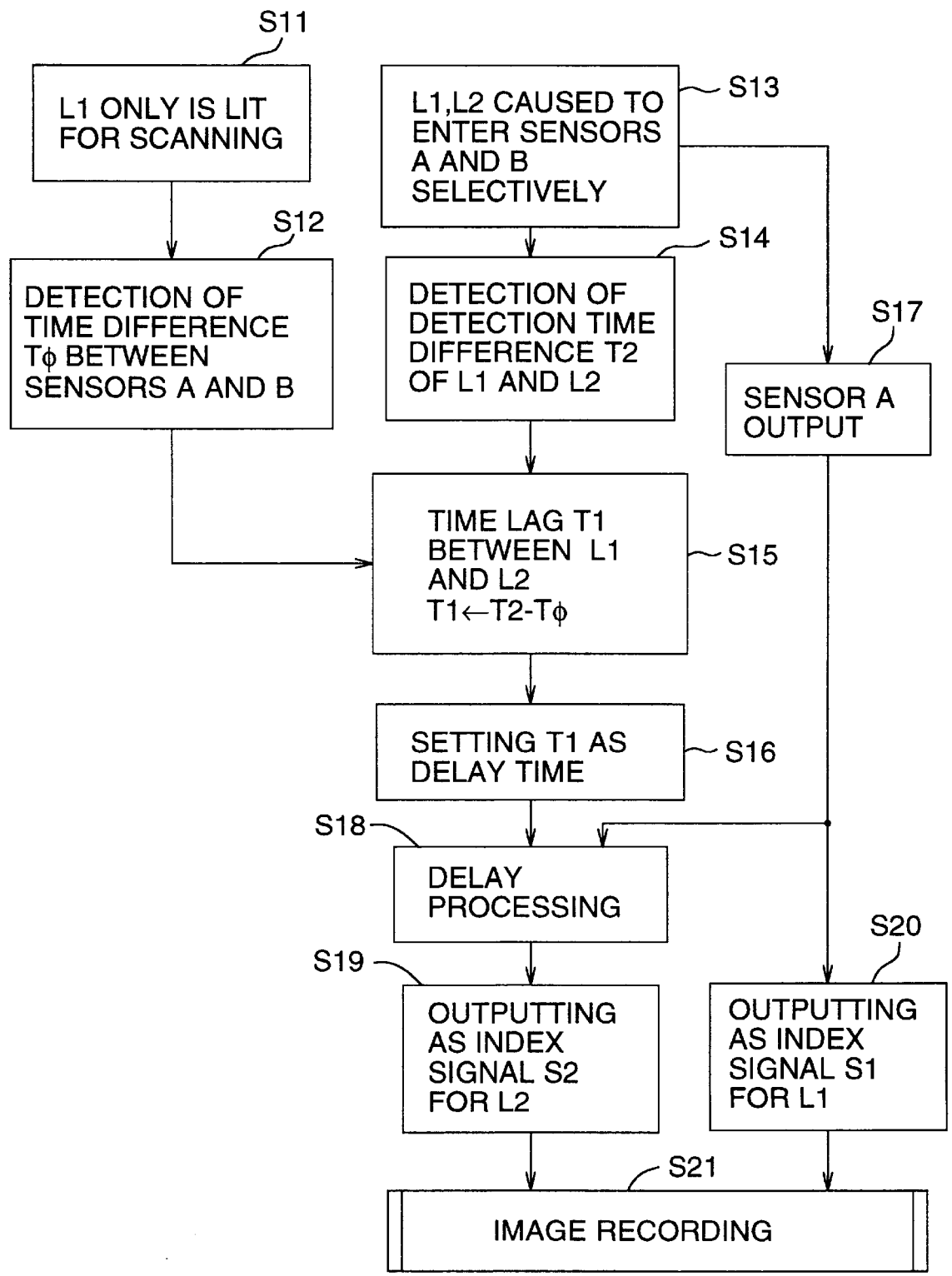
FIG. 20 is a flowchart showing the control of generation of synchronization signals in the fourth example.

The fourth example having an arrangement described above will be explained as follows in accordance with procedures shown by a flow chart in FIG. 20, referring to a time chart in FIGS. 21A–21G.

First, time lag Tφ between sensor A and sensor B is measured (S 11, S 12: a means for detecting detection interval for the same beam) through lighting and scanning of only laser beam L1, similarly to the previous example.

Then, laser beam L1 and laser beam L2 are caused to enter respectively sensor A and sensor B selectively, and detection signals of laser beam L1 and those of laser beam L2 are obtained respectively from sensor A and sensor B (S 13: a means for controlling detection interval for plural beams). Time delay T2 for generating detection signals at this time is measured (S 14: a means for detecting detection interval for plural beams).

In this case, when laser beam L1 and laser beam L2 are not staggered in the scanning direction, Tφ and T2 should be the same in time, and a difference T1 between them (←T2−Tφ) corresponds to a time lag in the scanning direction between laser beam L1 and laser beam L2. FIG. 9 shows an occasion wherein laser beam L2 is delayed for scanning (S 15: a time lag calculating means).

Therefore, detection signals (S 17) is outputted (S 20) as they are as index signal S1 corresponding to laser beam L1 of sensor A, while signals obtained by delaying the detection signals (S 17) of sensor A by the above-mentioned time lag T1 are generated (S 16, S 18) and the delayed signals are outputted as index signal S2 corresponding to laser beam L2 (S 19). The functions of S 16–S 20 correspond to a synchronization signal outputting means in the fourth example of the invention.

Namely, laser beam L2 is caused to scan being delayed from laser beam L1 by time lag T 1 and detection signals of sensor A are outputted corresponding to laser beam L1. Therefore, if the detection signals of sensor A are delayed by the time lag T 1 mentioned above, the delayed signals are outputted corresponding to the scanning position of laser beam L2.

Thus, image recording by means of laser beams L1 and L2 is conducted by controlling the position for start recording based on index signals S1 and S2 (S 21).

Even in the fourth example mentioned above, a time lag in the scanning direction between laser beam L1 and laser beam L2 is actually obtained and index signals S1 and S2 corresponding respectively to laser beam L1 and laser beam L2 are generated through delay processing corresponding to the time lag obtained. Therefore, index signals S1 and S2 which are highly accurate can be obtained even when the time lag mentioned above is not constant.

However, when the arrangement is one wherein laser beam L1 enters sensor A and laser beam L2 enters sensor B under the condition that laser beam L2 takes a lead for scanning and laser beam L1 follows it for scanning, the aforesaid T1 is calculated to be negative and thereby, index signal S2 corresponding substantially to laser beam L2 can not be generated based on detection signals of sensor A.

Therefore, when the time lag T1 is calculated to be a negative value, the relation between laser beam L1 and laser beam L2 entering respectively sensor A and sensor B selectively is reversed so that a laser beam that takes a lead toward the sensor A side for scanning is caused to enter. Or, output of sensor B are caused to be synchronization signals of laser beam L2 with output of sensor B by means of laser beam L2 as a reference and signals obtained by delaying output of sensor B by T1 are caused to be synchronization signals of laser beam L1. These functions correspond to a leading beam setting means.

Incidentally, even in the case of an arrangement wherein a time lag is calculated actually for conducting delay processing as in the foregoing, the number of laser beams can also be three or more.

For example, when three laser beams L1, L2 and L3 are used, index sensor 39 wherein three light-acceptors A, B and C are provided to be arranged in the scanning direction to match the number of the laser beams is prepared, and any one of the laser beams is lit and caused to scan to detect time intervals T$\phi$ 1 (between A and B) and T$\phi$ 2 (between B and C) in sensors A, B and C.

Then, laser beam L1, laser beam L2 and laser beam L3 are caused to enter respectively sensor A, sensor B and sensor C selectively, and detection signals are obtained respectively from sensors A, B and C and thereby detection signal intervals T2-1 (between A and B) and T2-2 (between B and C) are measured.

Delay time T1L2 of laser beam L2 for laser beam L1 is calculated as a difference between T2-1 and T$\phi$1, and delay time T1L3 of laser beam L3 for laser beam L2 is calculated as a difference between T2-2 and T$\phi$2.

In this case, it is acceptable that signals obtained by detecting laser beam L1 with sensor A are outputted as index signal S1 for laser beam L1, and signals obtained by delaying the index signal S1 by T1L2 mentioned above are outputted as index signal S2 for laser beam L2, and signals obtained by delaying index signal S1 by T1L2+T1L3 are outputted as index signal S3 for laser beam L3.

Incidentally, even when three or more laser beams are used, a laser beam entering sensor A located at the nearest side in the scanning direction needs to be one that takes a lead for scanning, but laser beams entering sensor B and thereafter do not need to be arranged in the order of scanning.

Even in the case wherein an actual time lag is calculated and thereby detection signals are delayed as described above, delay processing can be done by circuits shown in FIG. 19.

For example, when time interval T$\phi$ between sensor A and sensor B is obtained by the use of one laser beam, let it be assumed that clock dl 10 and clock dl 12 synchronize with each detection signal as shown in FIGS. 18E and 18F, and the count number of clock (cycle) is 10. On the other hand, when laser beams L1 and L2 enter respectively sensors A and B selectively, let it be assumed that clock dl 10 and clock dl 14 synchronize with each detection signal as shown in FIGS. 22F and 22C, and the count number of clock is 12.

In this case, a period of time (See FIG. 18C) is (10+$^2$⁄₁₆) ×cycle and a period of time shown in FIGS. 22A–22G is (12+$^4$⁄₁₆)×cycle. Therefore, a difference of count number of clock (cycle) is 2, and deviation of a fraction which can not be expressed with the count number of a clock is $^2$⁄₁₆ cycle.

Therefore, when detection signals of sensor A are delayed by an amount equivalent to a difference between time T2 measured through characteristics shown in FIGS. 22A–22G and time T$\phi$ measured through characteristics shown in FIGS. 18A–18G, it is acceptable that a delay corresponding to the aforementioned $^2$⁄₁₆ cycle is set by giving to the shift register 371 the clock dl 10 that is a clock delayed by two steps from clock dl 10 synchronizing with detection signals of sensor A, and a delay in an amount equivalent to two cycles is made by selecting the one delayed by two cycles with selector 372 and outputting it as an output of shift register 371.

Incidentally, in the fourth example mentioned above, index signals S1 and S2 (synchronization signals) corresponding respectively to laser beams L1 and L2 are generated by delaying detection signals of sensors A and B of index sensor 36 in index signal generating circuit 37. However, it is also acceptable to generate index signals S1 and S2 synchronizing respectively with detection signals of sensor A and sensor B under the condition that only laser beam L1 enters sensor A and only laser beam L2 enters sensor B and to generate data clock DCK matching with relation of scanning positions between laser beam L1 and laser beam L2 by giving the data identical to the delayed data of detection signals in the previous example to synchronization circuit 60 and by applying a predetermined delay processing to data clock (dot clock) DCK generated in the synchronization circuit 60.

As described above, the third and fourth examples of the invention show that in an image forming apparatus wherein a plurality of light beams are caused to scan simultaneously for concurrent recording of plural lines, synchronization signals corresponding respectively to the light beams accurately can be generated even when the positional relation in the scanning direction of the aforementioned plural light beams is not constant, thus, the position to start recording for each light beam can be controlled accurately and thereby image forming in high fidelity can be carried out simply and stably.

What is claimed is:

1. An image forming apparatus for forming an image on a recording medium, comprising:

a plurality of laser beam generating units, each laser beam generating unit being arranged for writing a different scanning line of an image in a primary scanning direction, corresponding to respective image signals applied to the respective laser beam generating units, on said recording medium at the same time;

a first beam detector;

a second beam detector;

wherein said first and second beam detectors are arranged in parallel in the scanning direction of said laser beam generating units and are located in a scanning path of laser beams generated by said laser beam generating units, so as to detect laser beams from said plurality of laser beam generating units and generate respective detecting signals corresponding to the detected laser beams;

time determining means for determining an amount of a time period that one of said plurality of said laser beam generating units scans from said first beam detector to said second beam detector;

beam detection controlling means for controlling said first and second beam detectors so that one of said plurality of laser beams is detected by only said first beam detector and said second beam detector detects only another one of said plurality of laser beams;

time delay determining means for determining an amount of a time delay from a first detecting signal that is generated from said first beam detector and a second detecting signal that is generated from said second beam detector while said beam detection controlling means controls said plurality of laser beams and said first and second beam detectors;

time lag calculation means for calculating a time lag between said amount of said time period and said time delay; and index signal generating means for generating a plurality of index signals which initiates each of said plurality of laser beam generating units to start scanning by respective ones of said plurality of laser beams, from a start position in said primary scanning direction; and wherein said index signal generating means includes signal delaying means for delaying one of said index signals relative to another one of said index signals in response to said calculated time lag.

2. The image forming apparatus of claim 1, wherein said first and second detectors are each larger than a profile of said plurality of laser beams.

3. The apparatus of claim 1, further comprising:

an initial beam identifying means for identifying an initial laser beam, in said primary scanning direction, among said plurality of laser beams; and an initial beam changing means for changing said initial laser beam among said plurality of laser beams so that said initial laser beam irradiates a beam detector that is located at a leading position in said primary scanning direction.

\* \* \* \* \*